(12) United States Patent
Kohtoku

(10) Patent No.: US 9,858,868 B2
(45) Date of Patent: Jan. 2, 2018

(54) DISPLAY APPARATUS FOR DISPLAYING AN IMAGE OUTSIDE OF A COVERED REGION

(71) Applicant: Sakai Display Products Corporation, Sakai-shi, Osaka (JP)

(72) Inventor: Yukihide Kohtoku, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 16 days.

(21) Appl. No.: 14/894,769

(22) PCT Filed: Jan. 22, 2014

(86) PCT No.: PCT/JP2014/051288
§ 371 (c)(1),
(2) Date: Nov. 30, 2015

(87) PCT Pub. No.: WO2015/111158
PCT Pub. Date: Jul. 30, 2015

(65) Prior Publication Data
US 2016/0104435 A1    Apr. 14, 2016

(51) Int. Cl.
G09G 5/10  (2006.01)
G09G 3/34  (2006.01)
G09G 3/36  (2006.01)
G09G 5/00  (2006.01)
G06F 3/03  (2006.01)
(Continued)

(52) U.S. Cl.
CPC ............ *G09G 3/3406* (2013.01); *G06F 3/03* (2013.01); *G09G 3/32* (2013.01); *G09G 3/3225* (2013.01); *G09G 3/34* (2013.01); *G09G 3/342* (2013.01); *G09G 3/3413* (2013.01); *G09G 3/36* (2013.01); *G09G 5/00* (2013.01); *G09G 2320/08* (2013.01); *G09G 2330/022* (2013.01); *G09G 2354/00* (2013.01); *G09G 2360/144* (2013.01); *G09G 2360/147* (2013.01); *G09G 2360/148* (2013.01); *G09G 2380/14* (2013.01)

(58) Field of Classification Search
CPC .................................................. G09G 3/3406
USPC ........................................................ 345/690
See application file for complete search history.

(56) References Cited

U.S. PATENT DOCUMENTS

2004/0196273 A1* 10/2004 Mitsumura .............. G09G 5/00
                                                              345/204
2007/0075965 A1    4/2007 Huppi et al.
(Continued)

FOREIGN PATENT DOCUMENTS

JP    2007-028512 A    2/2007
JP    2010-507870 A    3/2010
(Continued)

*Primary Examiner* — Long D Pham
(74) *Attorney, Agent, or Firm* — Rudy J. Ng; Bret E. Field; Bozicevic, Field & Francis LLP

(57) ABSTRACT

Provided is a display apparatus which allows a user to easily confirm the contents of an image during displaying, when a cover covering a display region is present, even without removing the cover. The display apparatus having a pixel region including a plurality of pixels is configured to, by a display control unit, determine whether the cover covering a part of the pixel region is present, and if it is determined that the cover is present, display the image in the pixels of the remaining part which is not covered by the cover.

14 Claims, 29 Drawing Sheets

(51) Int. Cl.
*G09G 3/32* (2016.01)
*G09G 3/3225* (2016.01)

(56) References Cited

U.S. PATENT DOCUMENTS

| | | | |
|---|---|---|---|
| 2010/0088633 A1* | 4/2010 | Sakurada | G06F 3/0416 715/790 |
| 2012/0212467 A1 | 8/2012 | Kohtoku | |
| 2013/0021349 A1 | 1/2013 | Kohtoku | |
| 2013/0033467 A1 | 2/2013 | Kohtoku | |
| 2015/0261366 A1* | 9/2015 | Wong | G06F 1/1626 345/173 |

FOREIGN PATENT DOCUMENTS

| | | |
|---|---|---|
| JP | 2011-008111 A | 1/2011 |
| JP | 2011-232979 A | 11/2011 |
| WO | WO2011052331 A1 | 5/2011 |
| WO | WO2011121687 A1 | 10/2011 |
| WO | WO2011125271 A1 | 10/2011 |
| WO | WO2012147686 A1 | 11/2012 |

* cited by examiner

DISPLAY APPARATUS FOR DISPLAYING AN IMAGE OUTSIDE OF A COVERED REGION

This application is the national phase under 35 U.S.C. §371 of PCT International Application No. PCT/JP2014/051288 which has an International filing date of Jan. 22, 2014 and designated the United States of America.

BACKGROUND OF THE INVENTION

1. Field of the Invention

The present invention relates to a display control in a display apparatus which has a pixel region including a plurality of pixels, and to a display apparatus which controls display contents of an image, when a cover covering a pixel region is present.

2. Description of Related Art

Techniques of display panels have advanced, and pixel region in equipment having a display unit has been expanded. Further, the number of equipment which are configured such that the display unit also plays a role of an operation unit (user interface) by embedding a touch panel in a display panel, and which allows a user to intuitively operate by interacting with an image such as an icon displayed on the display panel is increasing. However, there are a variety of problems regarding display control in the equipment having the above-described display unit. A portable equipment has a configuration in which the display unit also plays a role of the operation unit, and in order to increase an area of the pixel region, a portion for holding the equipment is decreased, which may lead to an erroneous operation in some cases. An invention is disclosed in which, when a hold of the display unit of the equipment is detected, the display region is changed within the pixel region so as to exclude the position held by the user.

In addition thereto, as an example of the portable equipment having the display unit, a tablet type personal computer (PC) has been widely distributed. The tablet type PC uses a large portion in a broad surface of a housing formed in a flat plate shape as a display surface. By further technical advancement, a sheet-shaped PC using a flexible display panel may also become to be distributed. In the equipment decreasing in thickness, it is possible to apply a change in the display region within the pixel region. Further, in the equipment that has the display unit decreasing in thickness, it is possible to perform display control so as to prevent a deterioration in visibility due to the reflection of strong environmental light.

SUMMARY OF THE INVENTION

In some cases, the display apparatus, specifically, the equipment that has the display unit decreasing in thickness is treated as a booklet such as a book, notebook or pocketbook, or a stationery such as papers or files which are made of a paper medium. For example, a thin type display apparatus is placed on a desk with the display surface thereof disposed upward, or is juxtaposed on a shelf together with a booklet. In particular, when the display apparatus is placed on the desk, another paper medium, sheet, or the like is further placed on the display apparatus, thereby covering a part or an entirety of the pixel region. In order to confirm contents of the image displayed on the pixel region, it is necessary for the user to remove the object placed thereon.

In addition, when observing the contents from only an exposed part of the pixel region, the user may misidentify the contents. In order to improve the convenience of the display apparatus, it is preferable that the user confirms easily the contents of the image during displaying, even without removing the cover.

The conventional invention is intended to detect the hold by the fingers of the user, or is intended to improve the deterioration in visibility due to reflection of strong outdoor environmental light. Therefore, since the case of presenting the cover is not assumed in all the patent documents, there has been no comprehensive solution to solve the problems which occur when the cover is present.

In consideration of the above-mentioned circumstances, it is an object of the present invention to provide a display apparatus which allows a user to easily confirm contents of an image during displaying, when a cover covering a pixel region is present, without removing the cover.

According to one embodiment of the present disclosure, if it is determined that a cover covering the pixel region of a display apparatus is present, an image or related information is displayed in the remaining part other than a part of the pixel region covered by the cover. Thereby, when the cover covering the display apparatus is present, the image may be appropriately displayed, and misidentification of the contents may also be prevented.

According to the present invention, when the cover covering a part of the pixel region is present, a user may easily confirm the contents of the image during displaying, even without removing the cover.

DESCRIPTION OF THE PREFERRED EMBODIMENTS

Hereinafter, embodiments of the present invention will be described in detail with reference to the accompanying drawings. Further, in Embodiments 1 to 3 which will be disclosed below, an example in which the present invention is applied to an information processing apparatus will be described.

Figure 1:
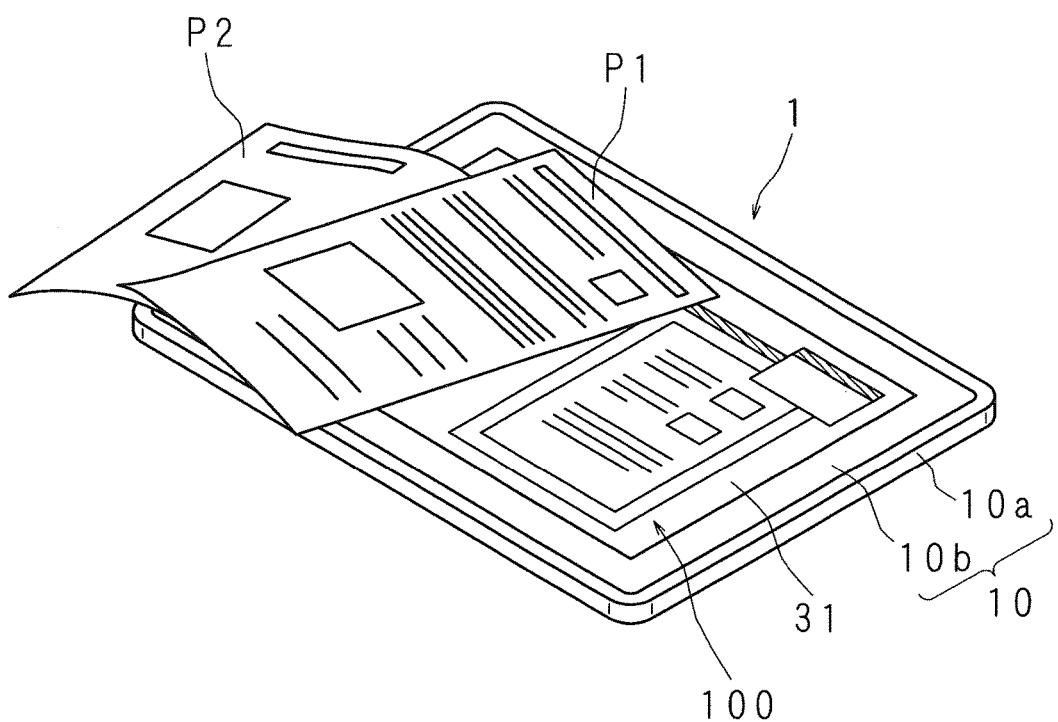
FIG. 1 is an explanatory view illustrating an outline of the present invention.

FIG. 1 is an explanatory view illustrating an outline of the present invention. An information processing apparatus 1 is a tablet type PC to which the present invention is applied. The information processing apparatus 1 displays an image on a display unit 100. The explanatory view of FIG. 1 illustrates a state in which the information processing apparatus 1 is placed with a surface of the display unit 100 disposed upward. Further, papers P1 and P2 are placed so as to cover a part of the surface of the display unit 100. Thereby, the image displayed on the part of the surface of the display unit 100 is covered, and is difficult to be viewed. In the information processing apparatus 1 according to the present invention, when a part of the surface of the display unit 100 is covered as illustrated in FIG. 1, the image displayed on the display unit 100 is displayed in the remaining part other than the covered part. Thereby, a user may accurately confirm the contents of the image during displaying, without removing the papers P1 and P2. Each configuration for achieving the above-described display control according to Embodiments 1 to 3 will be disclosed and respectively described below in detail.

Embodiment 1

Figure 2:
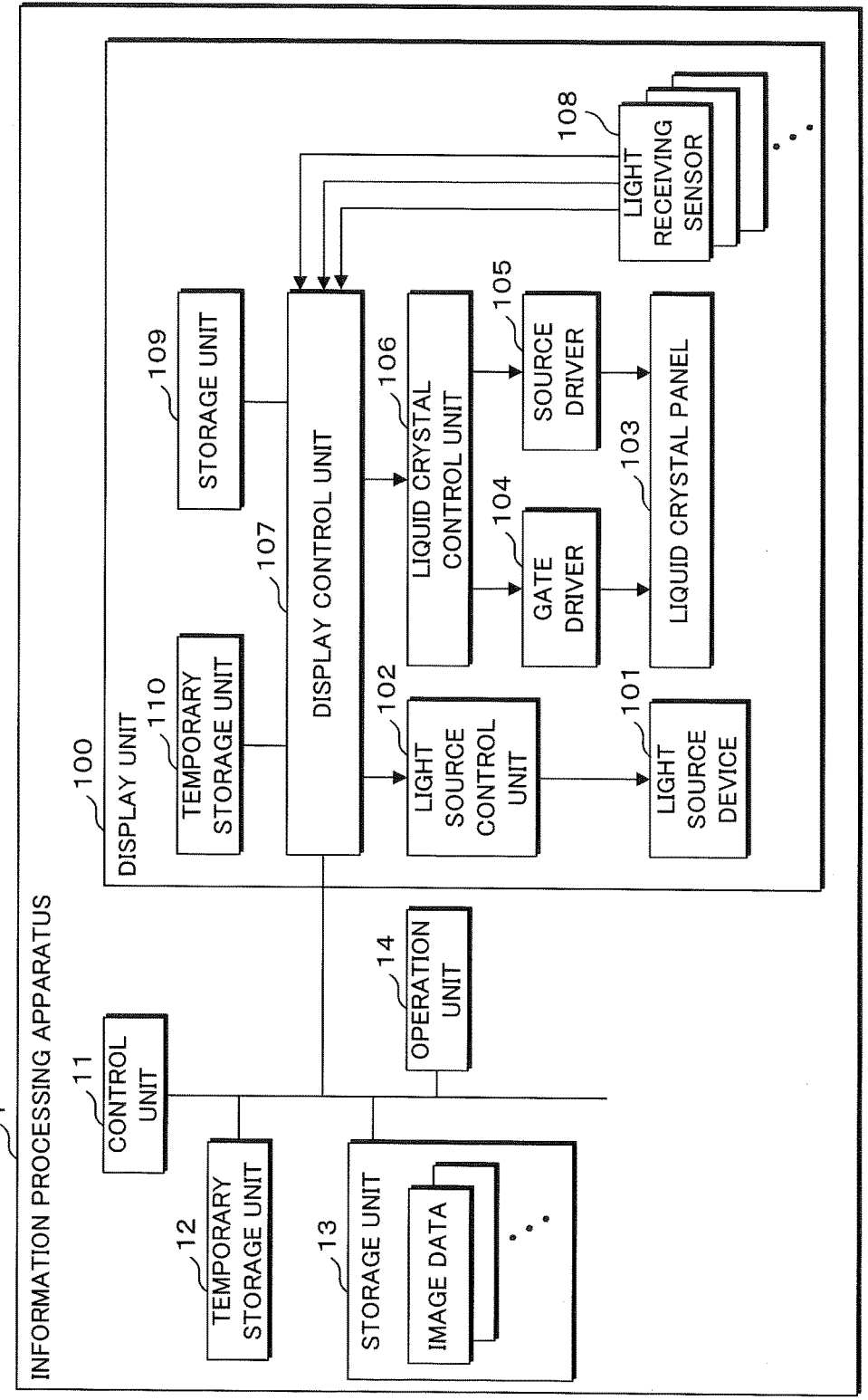
FIG. 2 is a block diagram illustrating a configuration of an information processing apparatus according to Embodiment 1.

FIG. 2 is a block diagram illustrating a configuration of the information processing apparatus 1 according to Embodiment 1. The information processing apparatus 1 includes a control unit 11, a temporary storage unit 12, a storage unit 13, an operation unit 14, and the display unit 100, which are housed in a housing 10.

The control unit 11 uses a central processing unit (CPU). The control unit 11 allows the tablet type PC to function as the information processing apparatus 1, by reading and executing a computer program (not illustrated) stored in the storage unit 13.

The temporary storage unit 12 uses a RAM such as a dynamic random access memory (DRAM), a synchronous DRAM (SDRAM) or the like. The temporary storage unit 12 stores temporarily information generated by the processing of the control unit 11. The storage unit 13 uses a flash memory. The storage unit 13 is stored with a plurality of data of the images to be displayed on the display unit 100 other than the computer program read by the control unit 11. Further, the storage unit 13 may use a storage device in addition to the flash memory.

The operation unit 14 uses the touch panel embedded in the display unit 100, and a button group (not illustrated) included in the housing 10. The operation unit 14 notifies the control unit 11 of the presence or absence of a contact on the touch panel by the user, and positional information of the contact position. In addition, the operation unit 14 notifies the control unit 11 of information such as the pressing of the button, pressing time and the like.

The control unit 11 outputs image data stored in the storage unit 13 to the display unit 100 based on the operation by the user which is detected by the operation unit 14, to display the image on the display unit 100.

The display unit 100 includes a light source device 101, a light source control unit 102, a liquid crystal panel 103, a gate driver 104, a source driver 105, a liquid crystal control unit 106, a display control unit 107, light receiving sensors 108, a storage unit 109, and a temporary storage unit 110.

The light source device 101 includes a plurality of light sources 111 arranged on a bottom of a chassis 10a of the housing 10 (see FIG. 3), control circuits for each of the light sources 111 and an optical sheet (not illustrated). The light sources 111 use, for example, a light emitting diode (LED), and are juxtaposed on the bottom of the chassis 10a in a lattice shape. The light source device 101 controls the turn on/off, and contrast of each of the plurality of light sources 111 by the control circuits, based on a control signal from the light source control unit 102. The light source control unit 102 is a circuit configured to generate the control signal for controlling the turn on/off, and contrast of each of the plurality of light sources 111, based on the light source control signal from the display control unit 107, and output the generated signal to the light source device 101.

The liquid crystal panel 103 is a rectangular display panel, and employs an active matrix type. The liquid crystal panel 103 includes respective elements such as a color filter, an electrode, an electrode for driving liquid crystal, and a transistor and auxiliary capacitor connected to the electrodes, which are respectively formed on a pair of transparent rectangular substrates, and is configured in such a manner that two substrates are bonded so as to face each other, and a liquid crystal material containing liquid crystal molecules is injected into a space formed between the substrates. The liquid crystal panel 103 has a pixel region 31 in which a plurality of pixels 30 (see FIG. 4) for achieving the image display are arranged in the lattice shape. The electrodes of each substrate are juxtaposed so as to correspond to the respective pixels 30 within the pixel region 31. The respective pixels 30 include two sub-pixels 30R and 30R, 30G and 30G, and 30B and 30B for a plurality of different colors (R (red), G (green), and B (blue)), and the respective electrodes are arranged so as to correspond to the sub-pixels. An electrode (a pixel electrode) on one substrate is connected with a thin film transistor (TFT) and the auxiliary capacitor. Source bus lines, gate bus lines and auxiliary capacitance bus lines are formed on the substrate to respectively supply a voltage signal to a source electrode and a gate electrode of the thin film transistor, and the other electrode of the auxiliary capacitor.

The gate driver 104 is connected to the gate bus line. The gate driver 104 outputs a gate signal to the gate electrode of the thin film transistor which is connected to the pixel electrode, to control the turn on/off of the thin film transistor. The source driver 105 is connected to the source bus line. The source driver 105 outputs a source signal to the source electrode of the thin film transistor which is connected to the pixel electrode, to control the electric field strength applied to a liquid crystal layer. The liquid crystal control unit 106 outputs the control signal to the gate driver 104 and the source driver 105, based on the image signal applied from the display control unit 107. By this, the transmission amount of light in the liquid crystal layers corresponding to the respective sub-pixels 30R and 30R, 30G and 30G, and 30B and 30B is controlled, and thereby the image display which finely represents gradation of the color and brightness of the respective pixels 30 in the pixel region 31 may be achieved.

The display control unit 107 uses a graphics processing unit (GPU). The display control unit 107 outputs the image signal to the liquid crystal control unit 106 and outputs a light source control signal to the light source control unit 102, based on the image data applied from the control unit 11. In addition, the display control unit 107 determines whether the cover covering the pixel region 31 is present, based on the data from the light receiving sensors 108 or the data from other sensors, and controls to display the image depending on the presence or absence of the cover.

The light receiving sensor 108 uses an optical element such as a photodiode, a phototransistor, or a photoresistor. The light receiving sensor 108 outputs electrical information depending on an amount of received light. The display control unit 107 is adapted so as to receive the information from the light receiving sensors 108. The light receiving sensors 108 are provided at plurality of positions on the pixel region 31. In Embodiment 1, one or a plurality of the light receiving sensors 108 are provided in the respective pixels 30. Further, one light receiving sensor 108 may be provided in each pixel group (for example, 8×8 pixels, or 10×10 pixels, etc.) including a plurality of pixels 30, or may be provided at four corners and a center of the pixel region 31, respectively.

The storage unit 109 uses the flash memory, and may also use various ROMs. The storage unit 109 is stored with a control program read by the display control unit 107. In addition, the storage unit 109 is stored with a value (a prescribed value or prescribed ratio, etc.) that functions as one of a variety of determination criteria referred to by the display control unit 107, or various information such as positional information for each of the plurality of the light receiving sensors 108. Further, the value that functions as various determination criteria may be rewritten according to an instruction from the control unit 11 through the display control unit 107, and the display control unit 107 may change the value that functions as the determination criteria depending on environmental light. The temporary storage unit 110 uses a RAM such as a DRAM or a SDRAM. The temporary storage unit 110 is temporarily stored with information generated by the processing of the display control unit 107.

Hereinafter, in the display unit 100 having the above-described configuration, a control for displaying an image in the remaining part which is not covered by the cover when the cover is present on the pixel region 31 during displaying the image on the pixel region 31 based on the image data applied from the control unit 11 by the display control unit 107 will be described.

Figure 3:
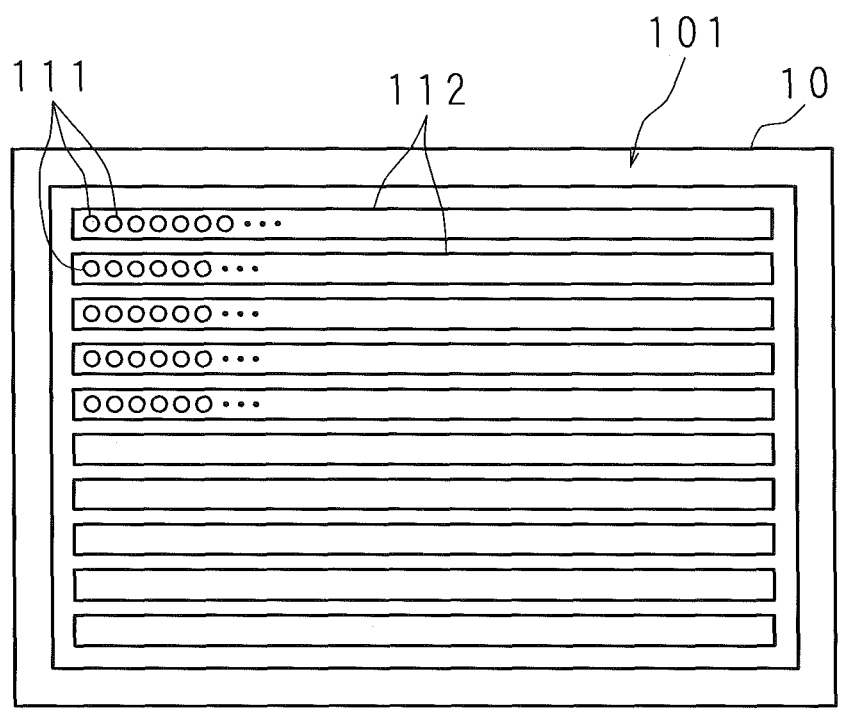
FIG. 3 is an explanatory view schematically illustrating an arrangement example of a plurality of light sources in a light source device of Embodiment 1.

FIG. 3 is an explanatory view schematically illustrating an arrangement example of the plurality of light sources 111 in the light source device 101 of Embodiment 1. FIG. 3 illustrates an arrangement of the respective light sources 111 as viewing the light source device 101 from an opening part of the chassis 10a on which the plurality of light sources 111 are installed. The light sources 111 are juxtaposed on an elongated substrate 112 in a long-side direction thereof. A plurality of substrates 112 are juxtaposed in a short-side direction so as to be laid in the long-side direction of the housing 10 of the information processing apparatus 1, such that the plurality of light sources 111 are juxtaposed in the lattice shape. In addition, the substrates 112 include control circuits (not illustrated) formed thereon to control the turn on/off, and contrast of each of the light sources 111, based on the control signal from the light source control unit 102. Further, the arrangement of the plurality of light sources 111 is not limited thereto. For example, the plurality of light sources 111 may be disposed in a staggered lattice shape or a zigzag shape, so that the positions thereof are shifted for each row or for a plurality rows.

Figure 4:
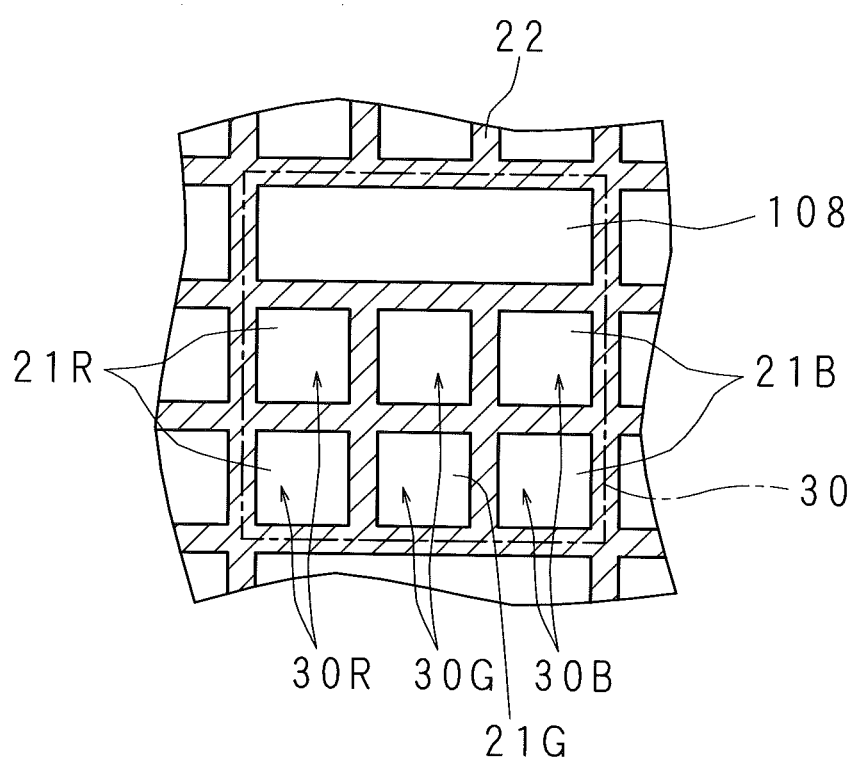
FIG. 4 is an explanatory view illustrating a light receiving sensor of Embodiment 1.

FIG. 4 is an explanatory view illustrating the light receiving sensor 108 of Embodiment 1. FIG. 4 is an enlarged view of a substrate facing the substrate on which the pixel electrode is provided. As illustrated in FIG. 4, color filters 21R, 21G and 21B of respective colors of RGB, and a black matrix 22 made of a resin film using carbon black, etc. are formed on the substrate. Further, the light receiving sensor 108 is disposed on the substrate. In Embodiment 1, one pixel 30 includes six sub-pixels 30R and 30R, 30G and 30G, and 30B and 30B, which are formed by being disposed in the lattice shape of two rows and three columns. One light receiving sensor 108 is provided in each pixel 30 so as to be laterally extended over three columns above the sub-pixels 30R and 30R, 30G and 30G, and 30B and 30B. Of course, the light receiving sensor 108 is not limited to the configuration provided as illustrated in FIG. 4. The light receiving sensor 108 may be provided so as to be arranged on the black matrix 22 in the lattice shape by one for each group of the plurality of pixels 30, in order to suppress a decrease in an amount of light.

Figure 5:
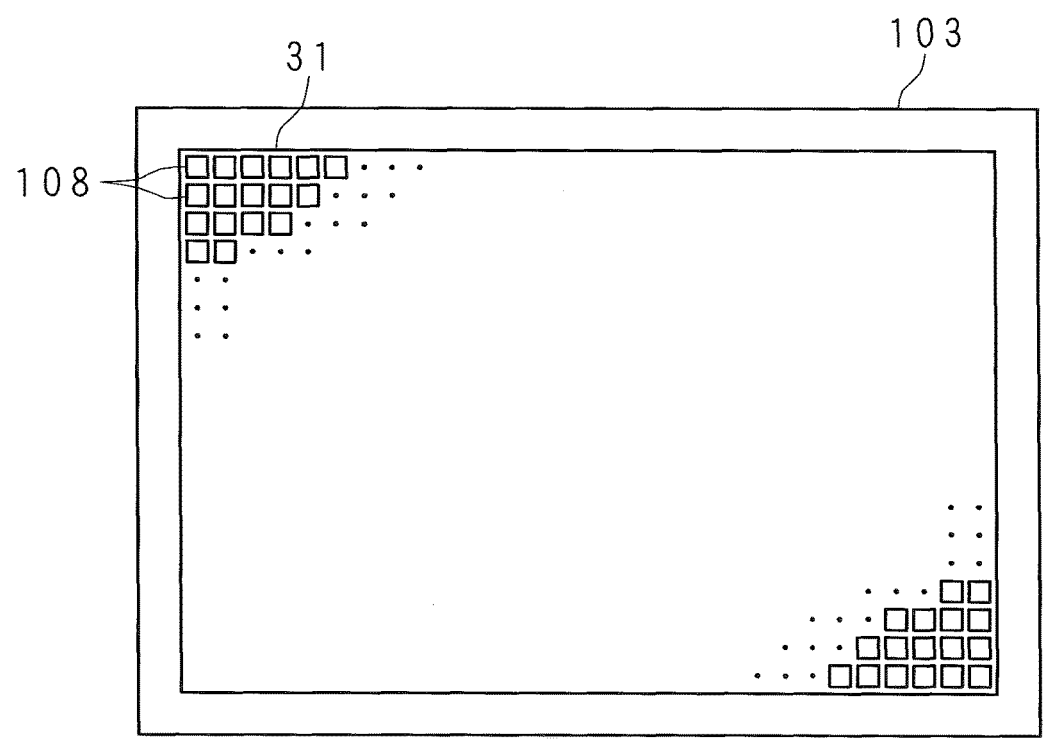
FIG. 5 is an explanatory view schematically illustrating an arrangement of the light receiving sensors according to Embodiment 1.

FIG. 5 is an explanatory view schematically illustrating an arrangement of the light receiving sensors 108 according to Embodiment 1. FIG. 5 illustrates a front of the liquid crystal panel 103. As illustrated in FIG. 4, the light receiving sensors 108 is provided in each pixel, then, as illustrated in FIG. 5, the light receiving sensors 108 are juxtaposed on the pixel region 31 in the lattice shape. The positions of each of the plurality of pixels 30 are specified by coordinates (v: vertical and h: horizontal) in a longitudinal direction (lines) and a lateral direction. Therefore, the positions of the light receiving sensors 108 are also specified by (v, h)=(m, n) (m=0, 1 and . . . , and n=0, 1 and . . . ) so as to correspond to the positions of the pixels 30. In this regard, the storage unit 109 is stored with information on the positions (v and h) of the light receiving sensors 108 in association with each of the plurality of the light receiving sensors 108, and the display control unit 107 may obtain received light amount data for each of the light receiving sensors 108 by specifying the positions of the light receiving sensors 108.

Figure 6:
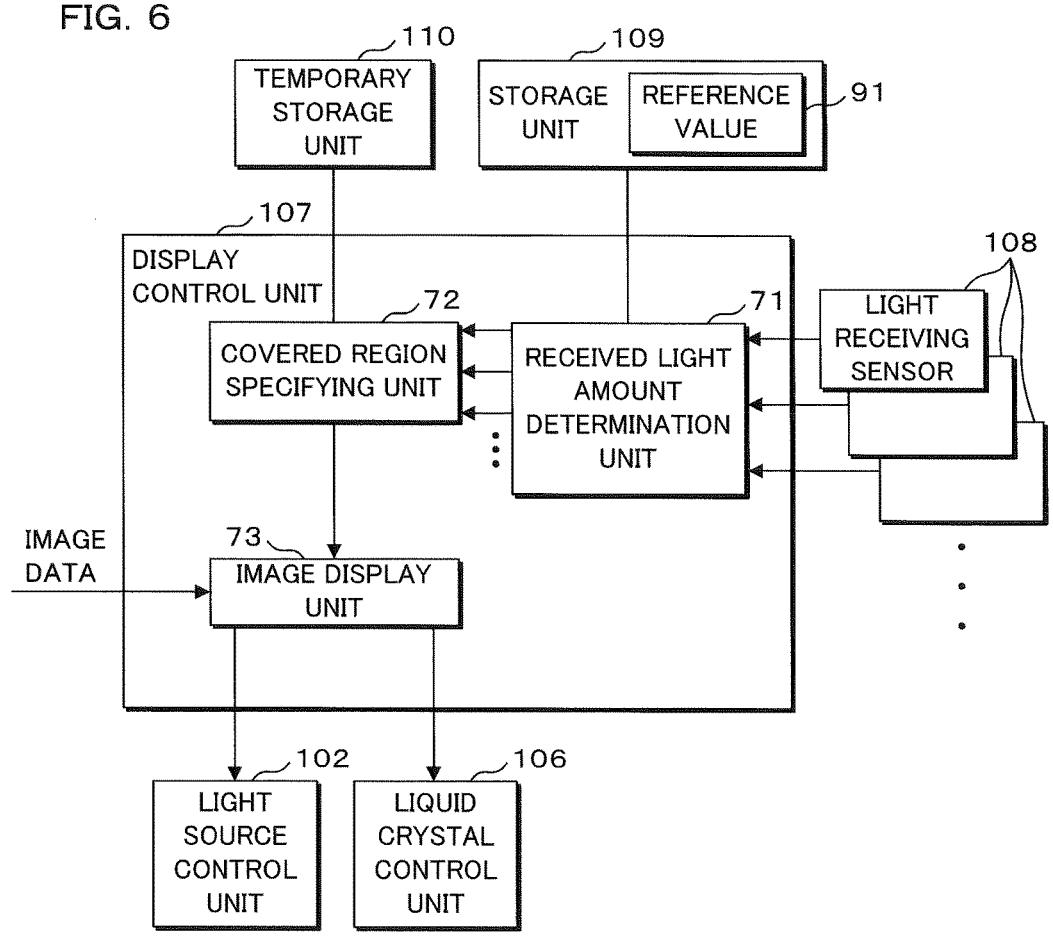
FIG. 6 is a functional block diagram illustrating functions achieved by a display control unit according to Embodiment 1.

The display control unit 107 controls to display an image depending on the presence or absence of the cover covering the pixel region 31, based on the received light amount data respectively obtained from the light receiving sensors 108 disposed as illustrated in FIG. 5. FIG. 6 is a functional block diagram illustrating functions achieved by the display control unit 107 according to Embodiment 1. The display control unit 107 functions as a received light amount determination unit 71, a covered region specifying unit (specifying unit) 72, and an image display unit 73.

The received light amount determination unit 71 respectively receives the received light amount data from the plurality of the light receiving sensors 108, determines whether the received light amount in each light receiving sensor 108 is a reference value (a first prescribed value) 91 or less within a plurality of prescribed values stored in the storage unit 109, and outputs the determined result. In Embodiment 1, the received light amount determination unit 71 determines whether the received light amount is the reference value 91 or less for each light receiving sensor 108 provided in the respective pixels 30, and outputs the determined result.

The covered region specifying unit 72 specifies a covered region (or the remaining part) covered by the cover, based on the determined result of the received light amount determination unit 71 for the received light amount in each light receiving sensor 108 and the position of each light receiving sensor 108, and obtains coordinate information for the pixel region 31. Specifically, the covered region specifying unit 72 specifies the covered region or the remaining part as the cover is present, only when it is determined that the determined result for the received light amount in the plurality of pixels 30 over a continuously extending surface shape is the reference value 91 or less. That is, even if it is determined that the received light amount in the plurality of the light receiving sensors 108 is the reference value 91 or less, when the corresponding pixels 30 are not formed in a continuous surface shape, the covered region specifying unit 72 determines that the cover is not present, and does not specify the covered region or the remaining part. In addition, the covered region specifying unit 72 may be configured to determine whether an outline of the shape of the specified covered region includes a linear outline, or whether the covered region includes an outer edge of the pixel region 31, so that it is possible to accurately determine the presence or absence of the cover.

The image display unit 73 determines a display region for displaying an image on the basis of the image data applied from the control unit 11, based on the coordinate information of the covered region specified by the covered region specifying unit 72. The image display unit 73 generates an image signal so as to display the image in the determined display region, generates the light source control signal so as to decrease the amount of light of the covered region or the amount of light of the region outside the display region, and outputs the generated signals to the liquid crystal control unit 106 and the light source control unit 102, respectively.

Figure 7:
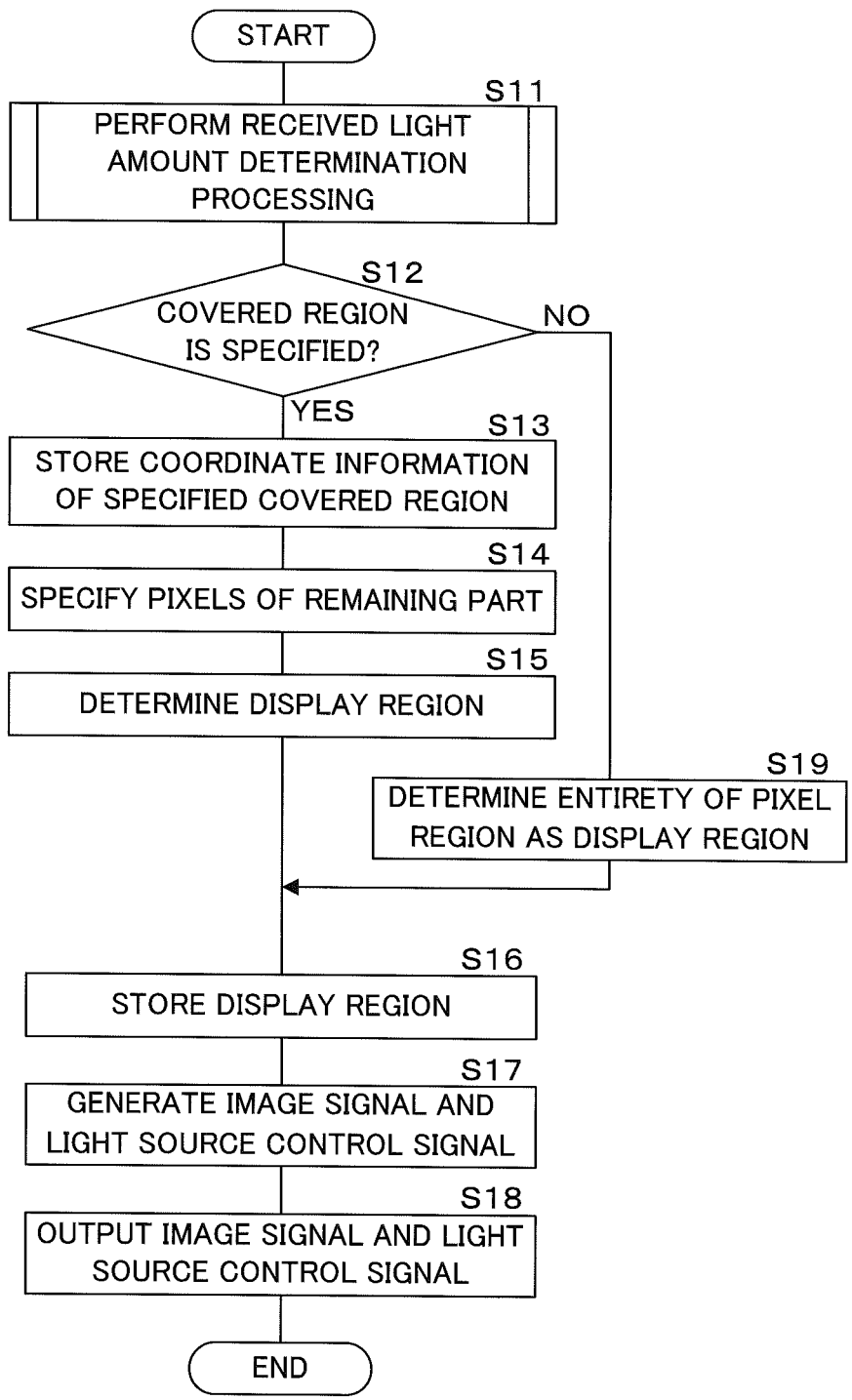
FIG. 7 is a flow chart illustrating an example of a processing procedure executed by the display control unit according to Embodiment 1.

FIG. 7 is a flow chart illustrating an example of the processing procedure executed by the display control unit 107 of Embodiment 1. The display control unit 107 periodically repeats the processing illustrated below at a predetermined time interval such as 500 milliseconds, for example.

The display control unit 107 performs received light amount determination processing (step S11), and thereby, positional information of the light receiving sensors 108 for which it has been determined that the received light amount is the reference value 91 or less is temporarily stored in the temporary storage unit 110.

Figure 8:
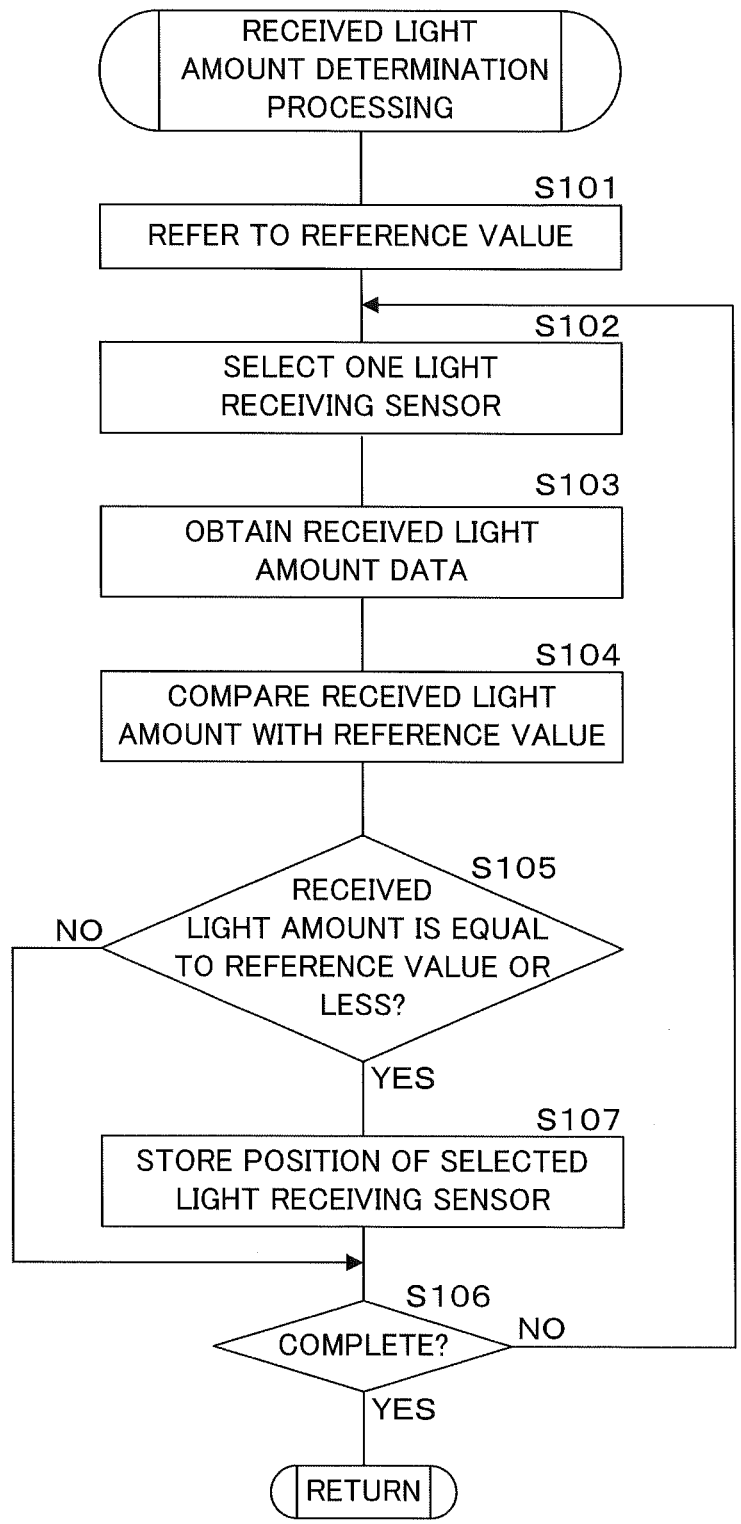
FIG. 8 is a flow chart illustrating an example of a procedure of received light amount determination processing.

FIG. 8 is a flow chart illustrating an example of a procedure of the received light amount determination processing. The processing procedure illustrated in the flow chart of FIG. 8 corresponds to details of step S11 in the flow chart of FIG. 7.

The display control unit 107 refers to the reference value 91 for the received light amount from the storage unit 109 (step S101). The display control unit 107 selects one light receiving sensor 108 of the plurality of the light receiving sensors 108 (step S102). Further, in Embodiment 1, because the light receiving sensors 108 are provided in the lattice shape similarly to the plurality of pixels 30, the display control unit 107 sequentially specifies and selects the light receiving sensors in an order of (v, h)=(0, 0), (0, 1) and . . . by the coordinates from the light receiving sensor 108 corresponding to the pixel 30 of v=0, and h=0.

The display control unit 107 obtains the received light amount data of the selected light receiving sensor 108 (step S103). The display control unit 107 compares the received light amount obtained based on the obtained received light amount data with the reference value 91 (step S104), and determines whether the received light amount is equal to the reference value 91 or less (step S105). If it is determined that the received light amount is higher than the reference value 91 (NO in S105), the display control unit 107 determines whether the comparison for all the light receiving sensors 108 is completed (step S106). If it is determined that the comparison is not completed (NO in S106), the display control unit 107 returns the processing to step S102, so as to select the next one light receiving sensor 108 from the plurality of the light receiving sensors 108.

In step S105, if it is determined that the received light amount is the reference value 91 or less (YES in S105), the display control unit 107 stores the position (information of (v and h)) of the selected light receiving sensor 108 as the positional information illustrating the covered region in the temporary storage unit 110 (step S107), and progresses the processing to step S106. In step S106, if it is determined that the comparison is completed (YES in S106), the display control unit 107 returns the processing to step S12 of the flowchart of FIG. 7.

Referring again to FIG. 7, the processing procedure by the display control unit 107 will be further described.

The display control unit 107 determines whether the covered region is specified based on the positional information group stored in the temporary storage unit 110 (step S12). Specifically, in this regard, the display control unit 107 determines whether the positional information group stored in the temporary storage unit 110 corresponds to the position which is a continuation of the surface shape as described above. When the positional information group corresponds to a discontinuous position, and is discrete, the display control unit 107 determines that the covered region is not specified. Further, if it is determined that the covered region is specified, it is determined that the cover is present.

If it is determined that the covered region is specified in step S12 (YES in S12), the display control unit 107 stores the coordinate information of the specified covered region (for example, the coordinate information corresponding to an apex of an appearance of the covered region) in the temporary storage unit 110 (step S13).

The display control unit 107 specifies the pixels of the remaining part, based on the coordinate information of the covered region stored in the temporary storage unit 110 (step S14), and determines the display region including a part and/or all of the pixels of the specified remaining part (step S15). In Embodiment 1, the image display unit 73 determines the display region as a rectangle having the largest area of the rectangles inscribed in the shape of the remaining part. In this regard, the display control unit 107 may determine the display region as a rectangle having an aspect ratio of the same ratio as the aspect ratio of the pixel region 31.

The display control unit 107 stores the display region determined in step S15 in the temporary storage unit 110 (step S16), generates the image signal and the light source control signal, so as to display the image in the display region based on the image data output from the control unit 11 (step S17), outputs the generated signals to the liquid crystal control unit 106 and the light source control unit 102, respectively (step S18), and ends the processing.

If it is determined that the covered region is not specified in step S12 (NO in S12), the display control unit 107 determines the entirety of the pixel region 31 as the display region (step S19), and progresses the processing to step S16.

Thereafter, until the processing from steps S11 to S19 are performed, the display control unit 107 continuously generates and outputs the image signal based on the image data output from the control unit 11, so as to display the image in the determined display region.

Further, the determination of step S12 is not essential, and when the received light amount based on the received light amount data obtained from a part of the light receiving sensors 108 is a reference value 91 or less, the processing may progress to step S14 that displays the image in the remaining part.

Figure 9:
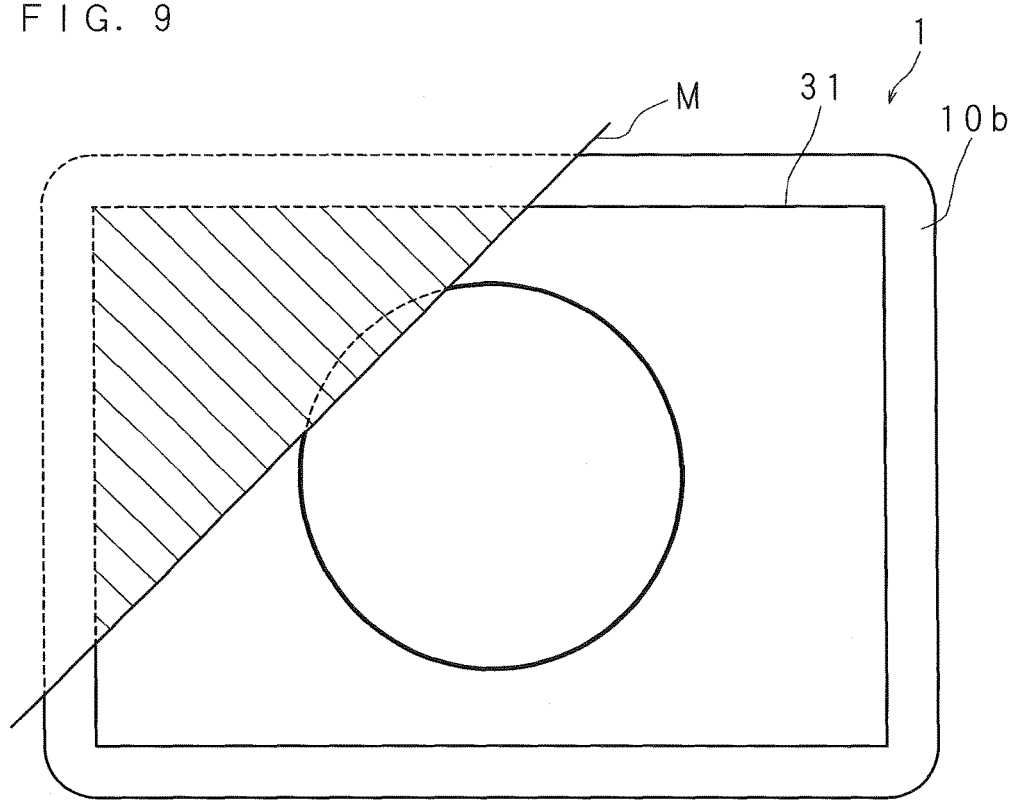
FIG. 9 is an explanatory view of a display example according to Embodiment 1 when a cover is present on a display unit.
Figure 10:
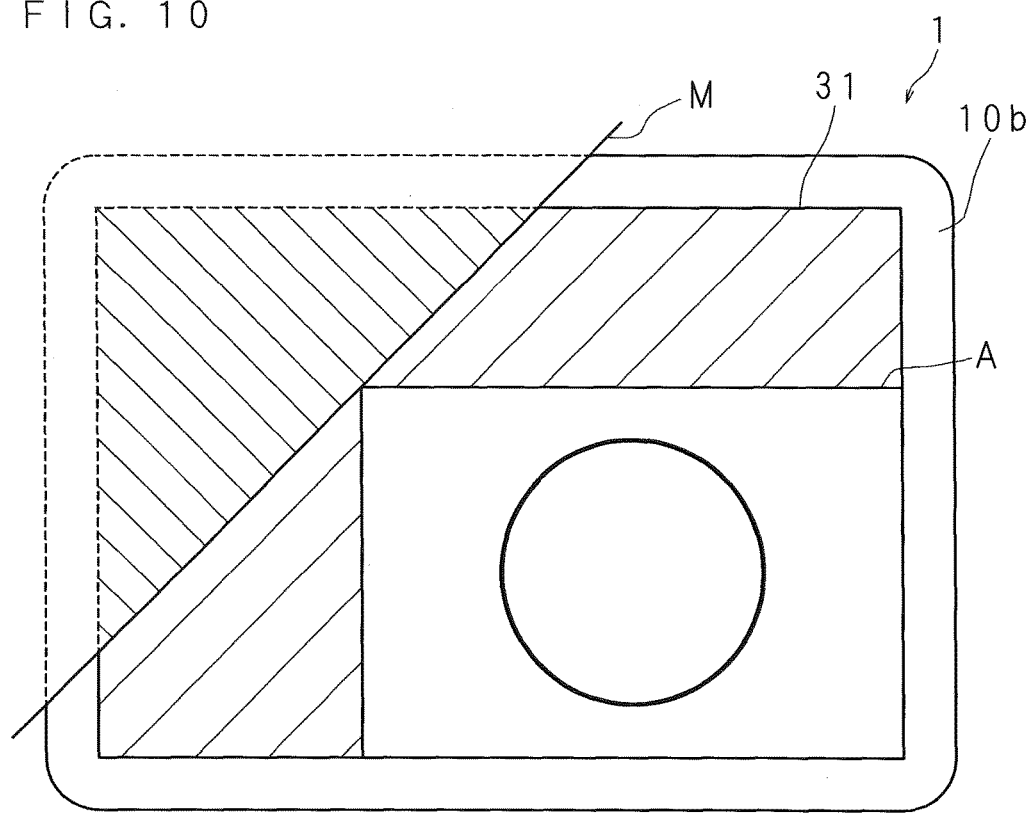
FIG. 10 is an explanatory view of another display example according to Embodiment 1 when the cover is present on the display unit.

FIGS. 9 and 10 are explanatory views of display examples according to Embodiment 1 when the cover is present on the display unit 100. FIG. 9 illustrates, as a comparison, a display example when the image is displaying by using the entirety of the pixels of the pixel region 31, and FIG. 10 illustrates a display example when it is determined that the covered region is specified by the display control unit 107. Symbols M in FIGS. 9 and 10 denote the covers.

As illustrated in FIG. 9, when the image is displaying by using the entirety of the pixel region 31, if the shield M is placed on the information processing apparatus 1, the shield M covers a part of the display unit 100. Thereby, a part of the pixel region 31 becomes the shielded region illustrated by hatching, and a part of the displayed image cannot be viewed. Compared with this, as illustrated in FIG. 10, if it is determined that the shielded region is specified, the display region illustrated by symbol A is determined by the processing based on the function of the image display unit 73 of the display control unit 107, and the image is displayed within the display region A so as not to be shielded by the shield M. Because the image is displayed so as to avoid the shield M, a user may easily confirm the contents of the image during displaying, even without removing the shield M. Further, as illustrated in FIG. 10, nothing is displayed in the regions other than the display region A within the remaining part outside the covered region in the pixel region 31. The corresponding region may also be set to be any color such as black or gray. The display control unit 107 may also decrease the amount of light of the light sources 111 located at the corresponding positions for the covered region, and may also decrease the amount of light of the light sources 111 located at the corresponding positions for the regions other than the display region A within the remaining part.

Embodiment 2

Embodiment 2 describes the processing when the cover is placed in the case in which the images of a plurality of objects are displayed by overlapping or arranging. The hardware configuration of an information processing apparatus 1 according to Embodiment 2 is the same as that of embodiment 1. Therefore, the hardware configuration equivalent thereto will be denoted by the same reference numerals, and will not be described in detail.

Figure 11:
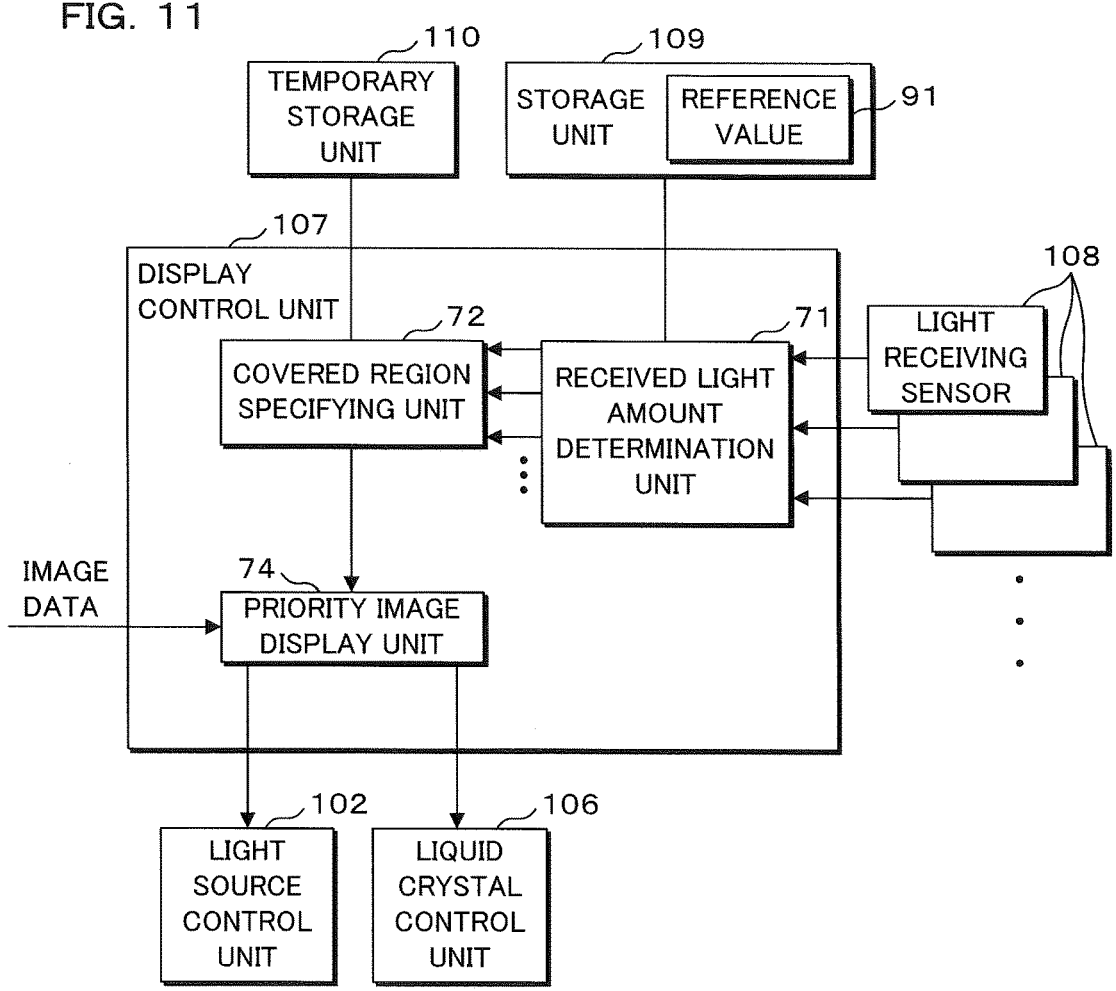
FIG. 11 is a functional block diagram illustrating functions achieved by a display control unit according to Embodiment 2.

FIG. 11 is a functional block diagram illustrating functions achieved by the display control unit 107 according to Embodiment 2. Therefore, functions thereof equivalent to those of Embodiment 1 will be denoted by the same reference numerals, and will not be described in detail. The display control unit 107 according to Embodiment 2 functions as the received light amount determination unit 71, the covered region specifying unit 72, and a priority image display unit 74.

The priority image display unit 74 determines a display region (display position and size) for displaying a plurality of images on the basis of the image data applied from the control unit 11, based on the coordinate information of the covered region specified by the covered region specifying unit 72. The image data output from the control unit 11 to the display control unit 107 includes information of the image to be displayed for each object, and the information of the image includes priority. The priority is applied from the control unit 11, based on whether it is the image selected and activated by the operation unit 14. Based on the information of the image for each object included in the image data, the priority image display unit 74 generates an image signal so as to preferentially display an image having a high priority, generates a light source control signal so as to decrease the amount of light of the covered region or the amount of light of the region outside the display region, and outputs the generated signals to the liquid crystal control unit 106 and the light source control unit 102, respectively.

Figure 12:
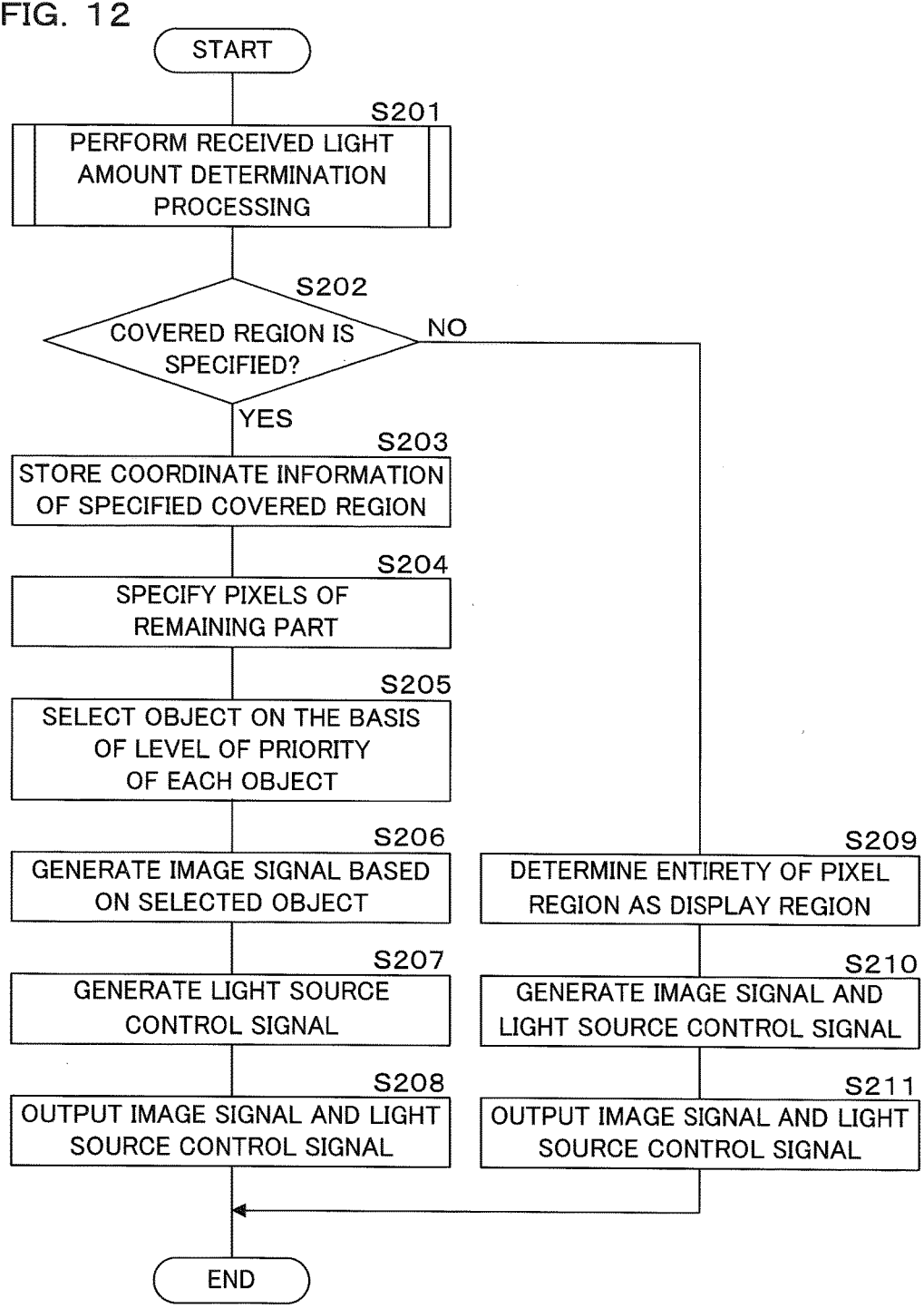
FIG. 12 is a flow chart illustrating an example of a processing procedure executed by the display control unit according to Embodiment 2.

FIG. 12 is a flow chart illustrating an example of a processing procedure executed by the display control unit 107 of Embodiment 2. The display control unit 107 periodically repeats the processing illustrated below at a predetermined time interval such as 500 milliseconds, for example.

The display control unit 107 performs received light amount determination processing (step S201), and thereby, information of the region determined that the received light amount is the reference value 91 or less is temporarily stored in the temporary storage unit 110.

Figure 13:
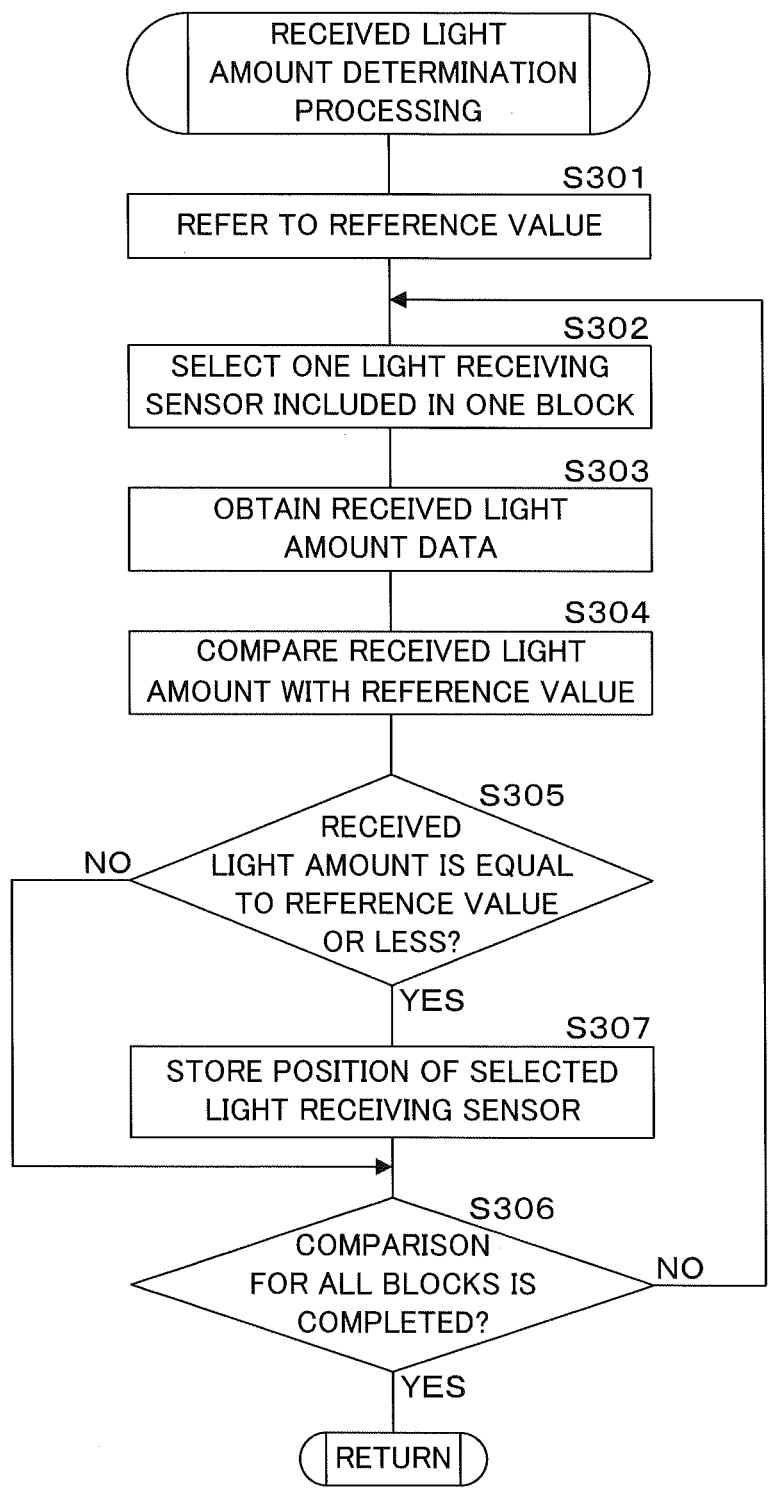
FIG. 13 is a flow chart illustrating an example of a procedure of received light amount determination processing according to Embodiment 2.

FIG. 13 is a flow chart illustrating an example of a procedure of the received light amount determination processing according to Embodiment 2. The processing procedure illustrated in the flow chart of FIG. 13 corresponds to details of step S201 in the flow chart of FIG. 12.

The display control unit 107 refers to the reference value 91 for the received light amount from the storage unit 109 (step S301), and selects one light receiving sensor 108 (step S302).

In the received light amount determination processing according to Embodiment 2, the display control unit 107 obtains the received light amount data from selected light receiving sensors 108 by thinning, rather than obtaining that from all the light receiving sensors 108 corresponding to each of the plurality of pixels 30. Specifically, the display control unit 107 selects one light receiving sensor 108 for each block including a group of 16×16 pixels 30 in the pixel region 31, for example, the light receiving sensor 108 corresponding to a center of each block. Thereby, the number of the determinations by the received light amount determination unit 71 is reduced. Further, it may be configured in such a manner that the light receiving sensors 108 are provided for each block of 16 pixels×16 pixels in advance, rather than they are provided corresponding to all the pixels 30. In this case, the region of the pixel region 31 in which the light from the light source device 101 is covered by the light receiving sensor 108 may be reduced, and the amount of light may be maintained at a high brightness.

The display control unit 107 obtains the received light amount data of the selected light receiving sensor 108 (step S303), compares the received light amount obtained based on the obtained received light amount data with the reference value 91 (step S304), and determines whether the received light amount is the reference value 91 or less (step S305). If it is determined that the received light amount is higher than the reference value 91 (NO in S305), the display control unit 107 determines whether the comparison of the light receiving sensor 108 for the all blocks is completed (step S306). If it is determined that the comparison is not completed (NO in S306), the display control unit 107 returns the processing to step S302, so as to select the light receiving sensor of the next block.

In step S305, if it is determined that the received light amount is the reference value 91 or less (YES in S305), the display control unit 107 stores positional information on the block of the selected light receiving sensor 108 in the temporary storage unit 110 (step S307), and progresses the processing to step S306. In step 306, if it is determined that the comparison is completed (YES in S306), the display control unit 107 returns the processing to step S202 of the flow chart of FIG. 12.

Referring again to FIG. 12, the processing procedure by the display control unit 107 will be further described.

The display control unit 107 determines whether the covered region is specified based on the positional information stored in the temporary storage unit 110 (step S202). Specifically, in Embodiment 2, the display control unit 107 determines whether the positional information of the block corresponding to the light receiving sensor 108 which is determined that the received light amount is the reference value 91 or less is stored in the temporary storage unit 110. If it is determined that the positional information is stored, the display control unit 107 specifies the covered region, based on the stored positional information of the block. In this regard, the display control unit 107 determines whether the blocks are continued in a surface shape, and if the blocks of which positional information is stored are discrete, the display control unit 107 determines that the covered region is not specified. Further, if it is determined that the covered region is specified, it is determined that the cover is present.

In step S202, if it is determined that the covered region is specified (YES in S202), the display control unit 107 stores the coordinate information of the specified covered region (for example, the coordinate information corresponding to an apex of an appearance of the covered region) in the temporary storage unit 110 (step S203).

The display control unit 107 specifies the pixels of the remaining part, based on the coordinate information of the covered region stored in the temporary storage unit 110 (step S204). The display control unit 107 selects the object on the basis of the level of the priority of each object, based on the image information for each object included in the image data obtained from the control unit 11 (step S205). The display control unit 107 generates the image signal based on the selected object (step S206). Further, generation processing of the image signal based on the priority in steps S205 and 206 will not be described in detail. Furthermore, the display control based on the priority employs various methods disclosed in International Publication Nos. WO2011/125271, WO2011/052331, and WO2011/121687.

The display control unit 107 decreases the amount of light of the light sources 111 corresponding to the covered region, and generates the light source control signal corresponding to the generated image signal (step S207). The display control unit 107 outputs the generated image signal and the light source control signal to the light source control unit 102 and the liquid crystal control unit 106, respectively (step S208), and ends the processing.

In step S202, if it is determined by the display control unit 107, that the covered region is not specified (NO in S202), the display control unit 107 determines the entirety of the pixel region as the display region (step S209), generates the image signal and the light source control signal, based on the image information for each object included in the image data obtained from the control unit 11 (step S210), outputs the generated image signal and light source control signal (step S211), and ends the processing.

Figure 14:
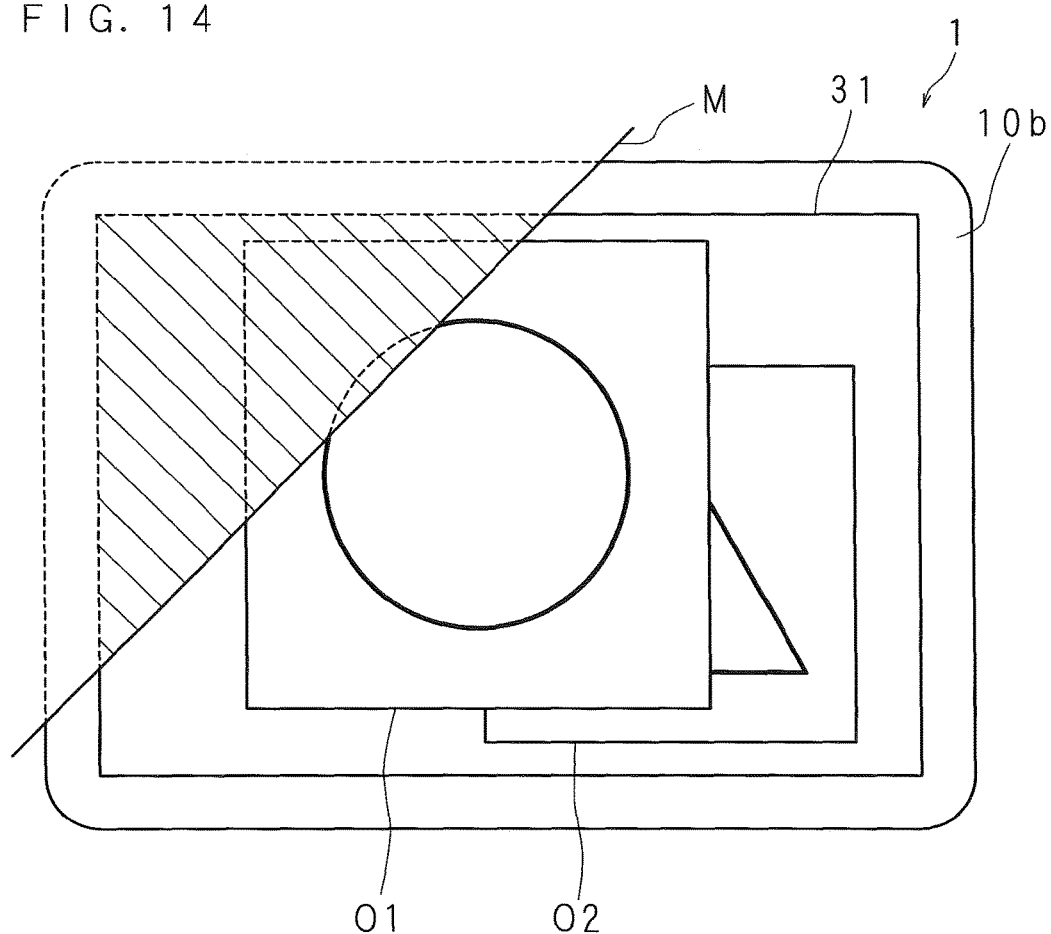
FIG. 14 is an explanatory view of a display example according to Embodiment 2 when the cover is present on the display unit.
Figure 15:
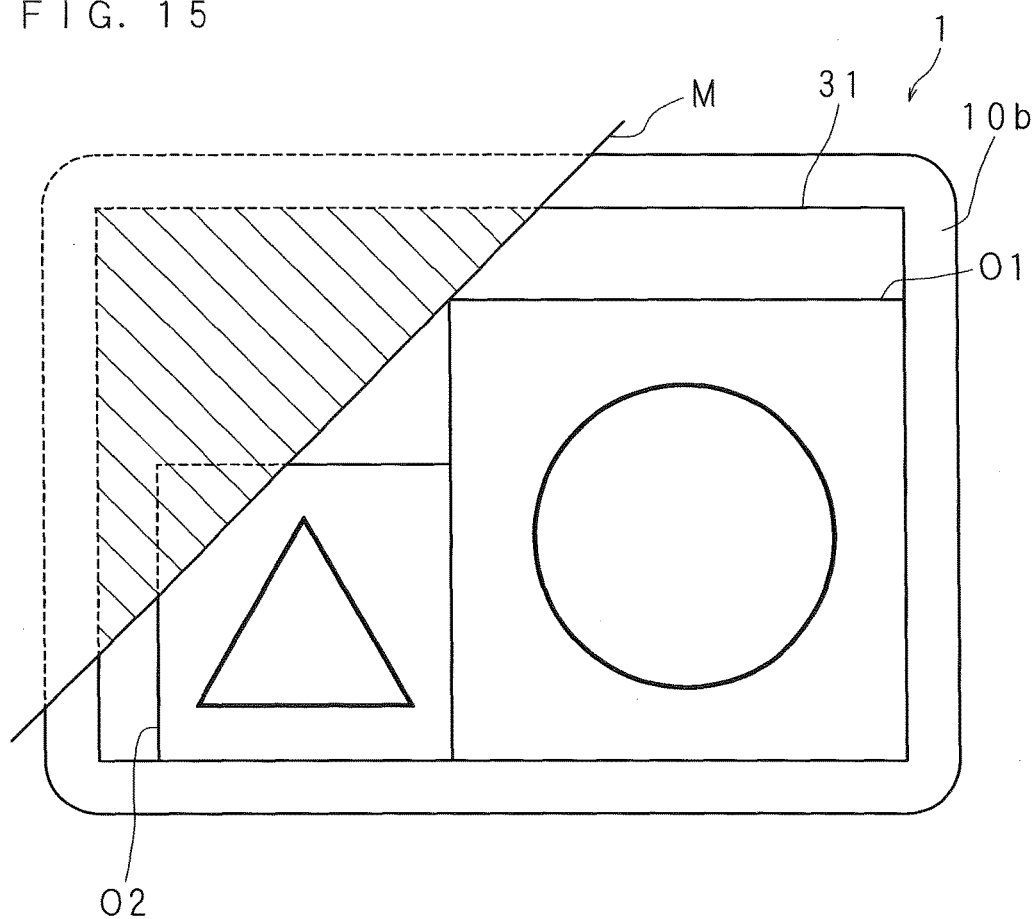
FIG. 15 is an explanatory view of a display example according to Embodiment 2 when the cover is present on the display unit.

Furthermore, a content example of the priority image display will be illustrated and described. FIGS. 14 and 15 are explanatory views of display examples according to Embodiment 2 when the cover is present on the display unit 100. FIG. 14 illustrates, as a comparison, a display example when the image is displaying by using the entirety of the pixels of the pixel region 31, and FIG. 15 illustrates a display example when it is determined that the covered region is specified by the display control unit 107. Symbols M in FIGS. 14 and 15 denote the covers.

As illustrated in FIG. 14, when the image is displaying by using the entirety of the pixel region 31, so that two objects O1 and O2 are overlapped with each other, if the cover M is placed on the information processing apparatus 1, the cover M covers a part of the display unit 100. Thereby, it becomes a state in which a part of the pixel region 31 becomes the covered region illustrated by hatching, and a part of the displayed image cannot be viewed. Compared with this, as illustrated in FIG. 15, if it is determined that the covered region is specified, by the processing of the display control unit 107, the object O1 is displayed so as to be increased in size as much as possible, without being covered within the pixels of the remaining part. And, the object O2 is displayed at a position so as to be largely displayed as much as possible, within a region outside the region of the remaining part occupied by the image of the object O1. In this regard, a part of the image of the object O2 is included in the covered region. The image of the object O1 having at least a high priority, for example, the image of the object O1 which is selected and activated is displayed so as to avoid the cover M. Therefore, the user may confirm the contents of the image of the object O1 having a high priority, without removing the cover M. Also in this case, the display control unit 107 may decrease the amount of light of the light sources 111 located at the corresponding positions for the covered region, and may decrease the amount of light of the light sources 111 located at the corresponding positions for the regions other than the range occupied by the display position and the size of the objects O1 and O2.

Figure 16:
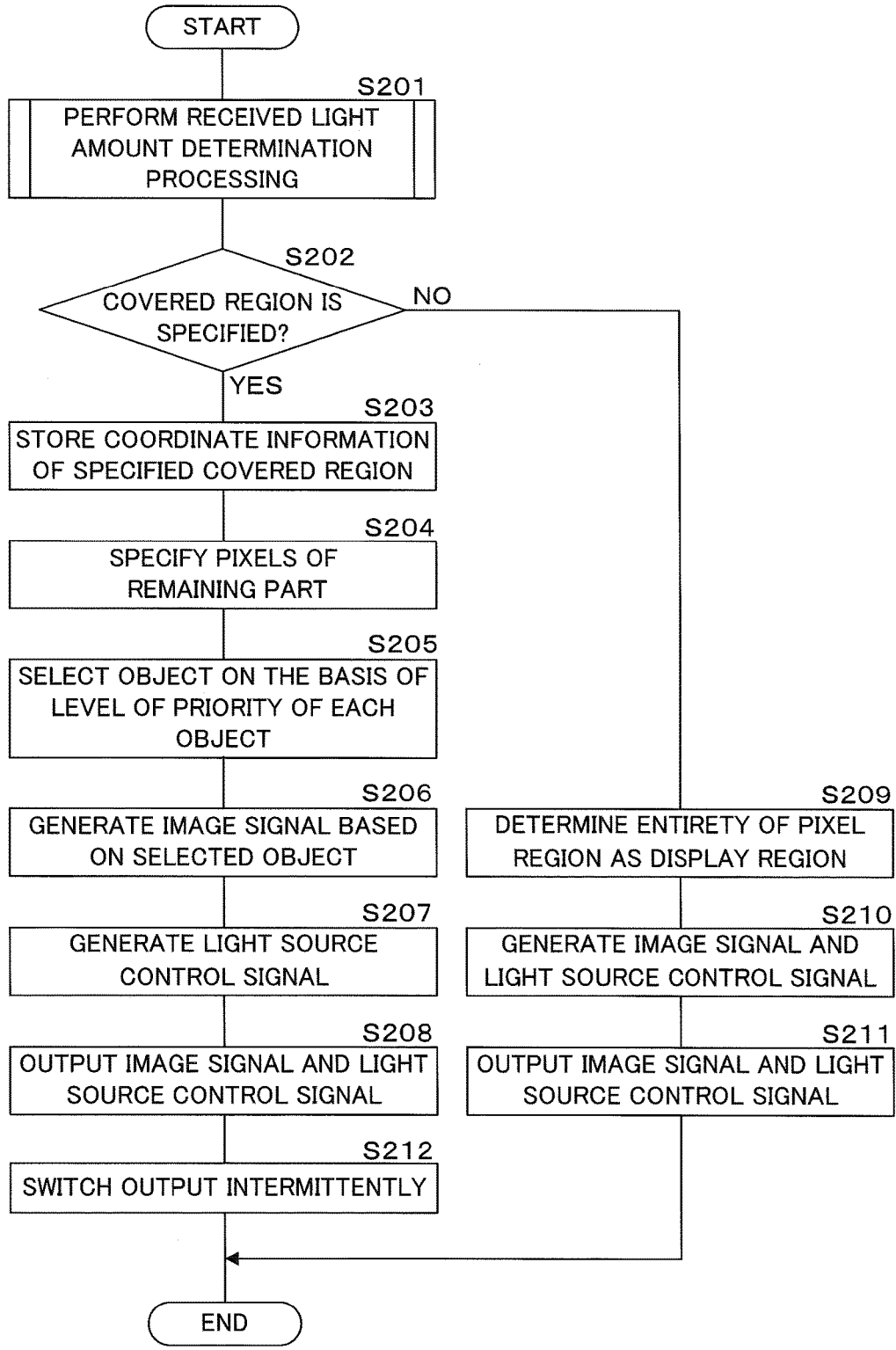
FIG. 16 is a flow chart illustrating another example of the procedure of the received light amount determination processing according to Embodiment 2.

In addition, by the functions of the priority image display unit 74, during displaying the image having a high priority in the remaining part, the display control unit 107 may control so as to display the image by intermittently replacing it with an image having a low priority. FIG. 16 is a flow chart illustrating another example of the procedure of the received light amount determination processing according to Embodiment 2. Further, the steps of the processing procedure illustrated below which are equivalent to the flow chart of FIG. 12 will be denoted by the same reference numerals, and will not be described in detail.

In step S202, if it is determined that the covered region is specified (YES in S202), the display control unit 107 stores the coordinate information of the specified covered region (for example, the coordinate information corresponding to the apex of the appearance of the covered region) in the temporary storage unit 110 (step S203). The display control unit 107 specifies the pixels of the remaining part (S204), selects the object (S205), generates the image signal based on the selected object (step S206), and generates the corresponding light source control signal (S207). The display control unit 107 outputs the generated image signal and light source control signal to the light source control unit 102 and the liquid crystal control unit 106, respectively (S208). The display control unit 107 intermittently switches the output (step S212), and ends the processing. Further, a time for intermittently switching in step S212 may be, for example, once or for 3 seconds every 10 seconds or the like.

Figure 17:
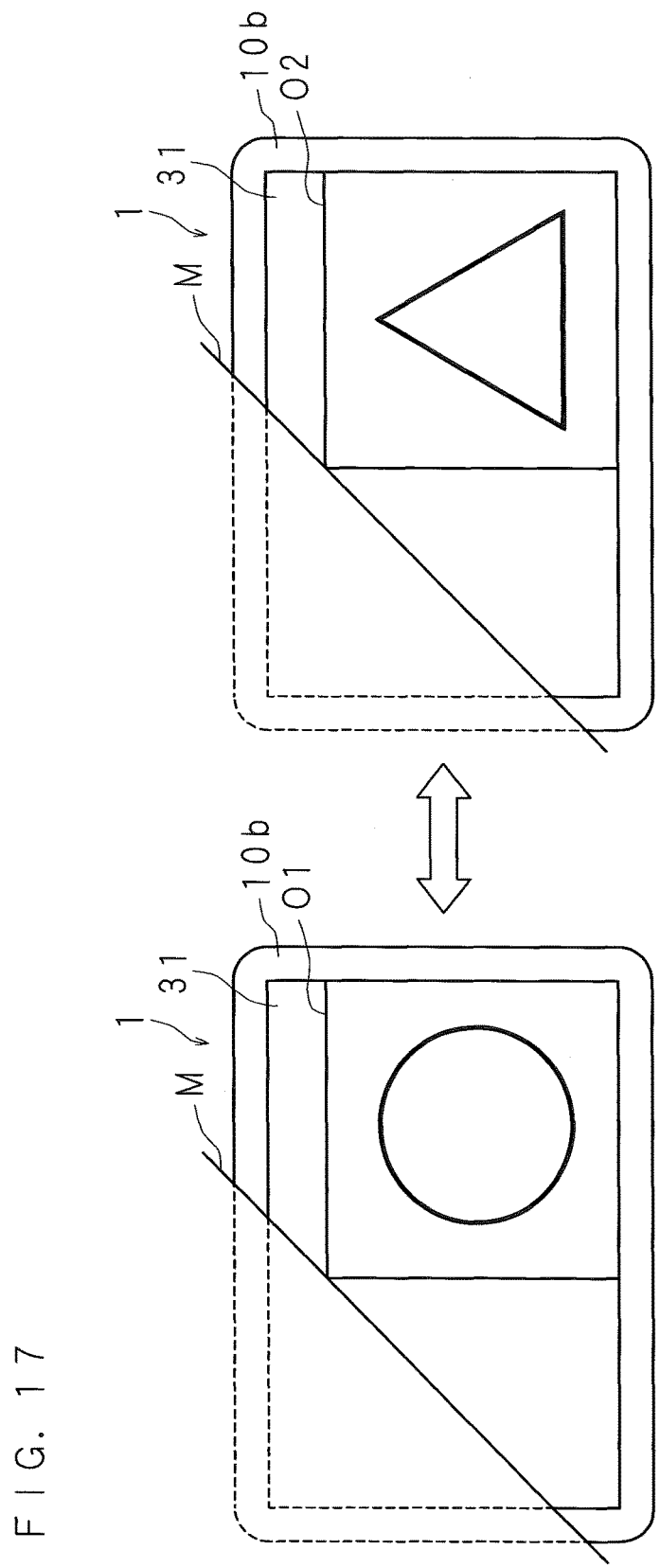
FIG. 17 is an explanatory view of another display example according to Embodiment 2 when the cover is present on the display unit.

FIG. 17 is an explanatory view of another display example according to Embodiment 2 when the cover is present on the display unit 100. FIG. 17 illustrates a display example when it is determined that the covered region is specified by the display control unit 107, which corresponds to the display example illustrated in FIG. 14 as a comparative example. Symbols M in FIG. 17 denote the covers. A left (lower) part of FIG. 17 illustrates an example when an image of an object having a high priority is displayed, and an right (upper) part thereof illustrates an example when the image is switched to the image display of an object having a low priority. As illustrated in FIG. 17, if it is determined that the covered region is specified, by the processing based on the functions of the priority image display unit 74 of the display control unit 107, the object O1 is displayed so as to be increased in size as much as possible, without being covered within the pixels of the remaining part. And, the object O2 is intermittently displayed in the same manner as described above. A time for intermittently displaying the object O2 is, for example, 3 seconds of 10 seconds as described above, Thereby, the user may also confirm the contents of the image of the object O2 having a low priority, without removing the cover M.

Embodiment 3

In Embodiment 3, related information of the displayed image is displayed by overlapping on the image in a caption form. The hardware configuration of an information processing apparatus 1 according to Embodiment 3 is the same as that of embodiment 1, and therefore, will be denoted by the same reference numerals, and will not be described in detail.

Figure 18:
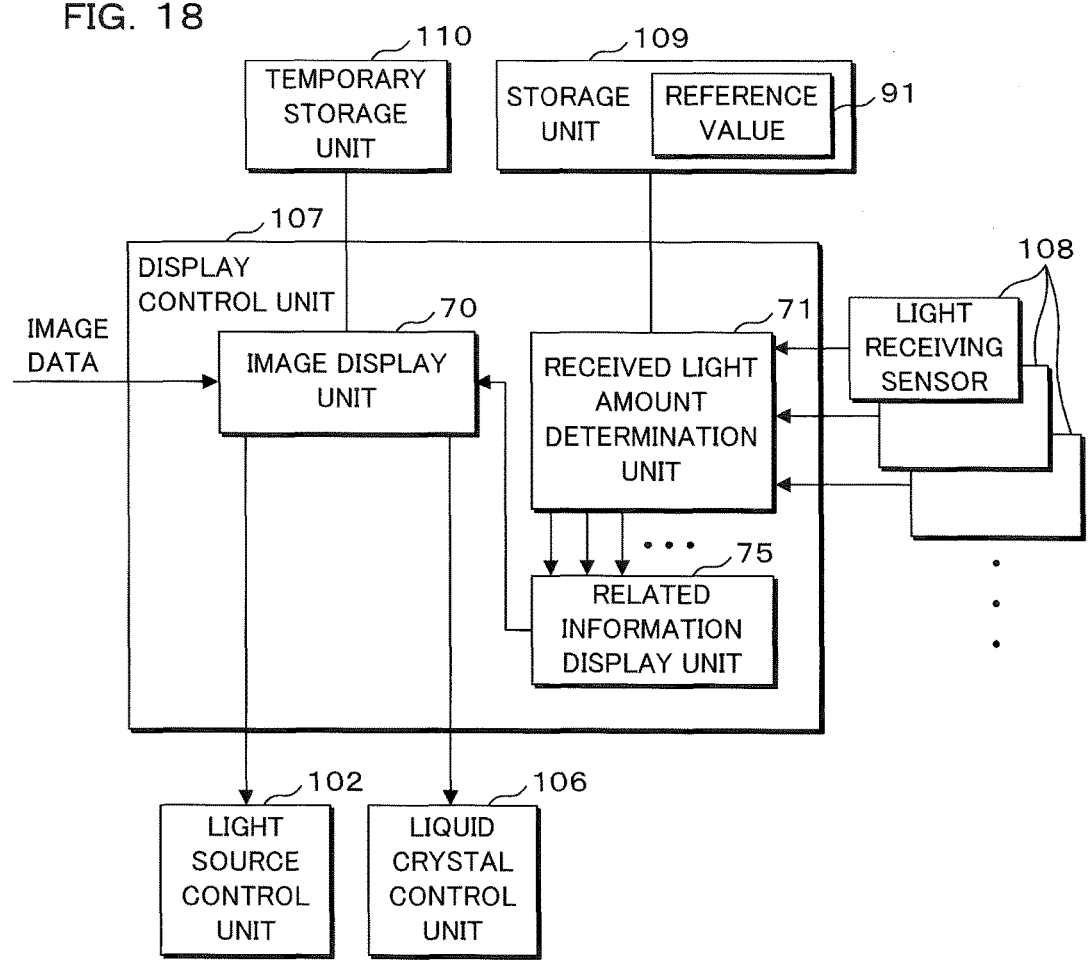
FIG. 18 is a functional block diagram illustrating functions achieved by a display control unit according to Embodiment 3.

FIG. 18 is a functional block diagram illustrating functions achieved by the display control unit 107 according to Embodiment 3. The display control unit 107 functions as an image display unit 70, the received light amount determination unit 71, and related information display unit 75. The functions of the received light amount determination unit 71 is the same as the functions described in Embodiment 1, and therefore will not be described in detail.

The image display unit 70 generates an image signal for displaying in the entirety of the pixel region 31 based on the image data applied from the control unit 11, generates a light source control signal corresponding to the image signal, and outputs the generated signals to the liquid crystal control unit 106 and the light source control unit 102, respectively. In addition, if it is determined that the related information is to be displayed by the related information display unit 75, the image display unit 70 outputs the image signal to the liquid crystal control unit so as to display the related information included in the image data applied from the control unit 11 in the caption form. The related information may include characters or image. In addition, the caption form may be a state in which, by using a laterally or longitudinally extended region at an end part of the pixel region 31, the characters or image are displayed by stopping or having a movement such as a scroll or a flash. Further, the display control of the related information will not be described in detail, and may employ various methods of graphic display disclosed in International Publication Nos. WO2011/052331, and WO2011/121687. The image display unit 70 generates the image signal so as to display the related information by being overlapped on the image included in the image data, and outputs the generated signal to the liquid crystal control unit 106.

The related information display unit 75 determines the display/non-display of the related information, based on the determination results of the received light amount determination unit 71 for the received light amount in each light receiving sensor 108 and the position of each light receiving sensor 108. Specifically, when the positional information is not stored in the temporary storage unit 110, since the cover is not present on the pixel region 31, the related information display unit 75 determines not to display the related information. The related information display unit 75 may be configured to, even when the positional information is stored in the temporary storage unit 110, determine whether a positional information group stored therein corresponds to the position which is a continuation of the surface shape, and when the positional information group corresponds to the continued position, since the cover is present, determine to display the related information. Further, when the positional information group is stored even singly, the related information display unit 75 may determine to display the related information. When the received light amount based on the received light amount data in a specific light receiving sensor 108 is the reference value 91 or less, the related information display unit 75 may determine to display the related information.

Figure 19:
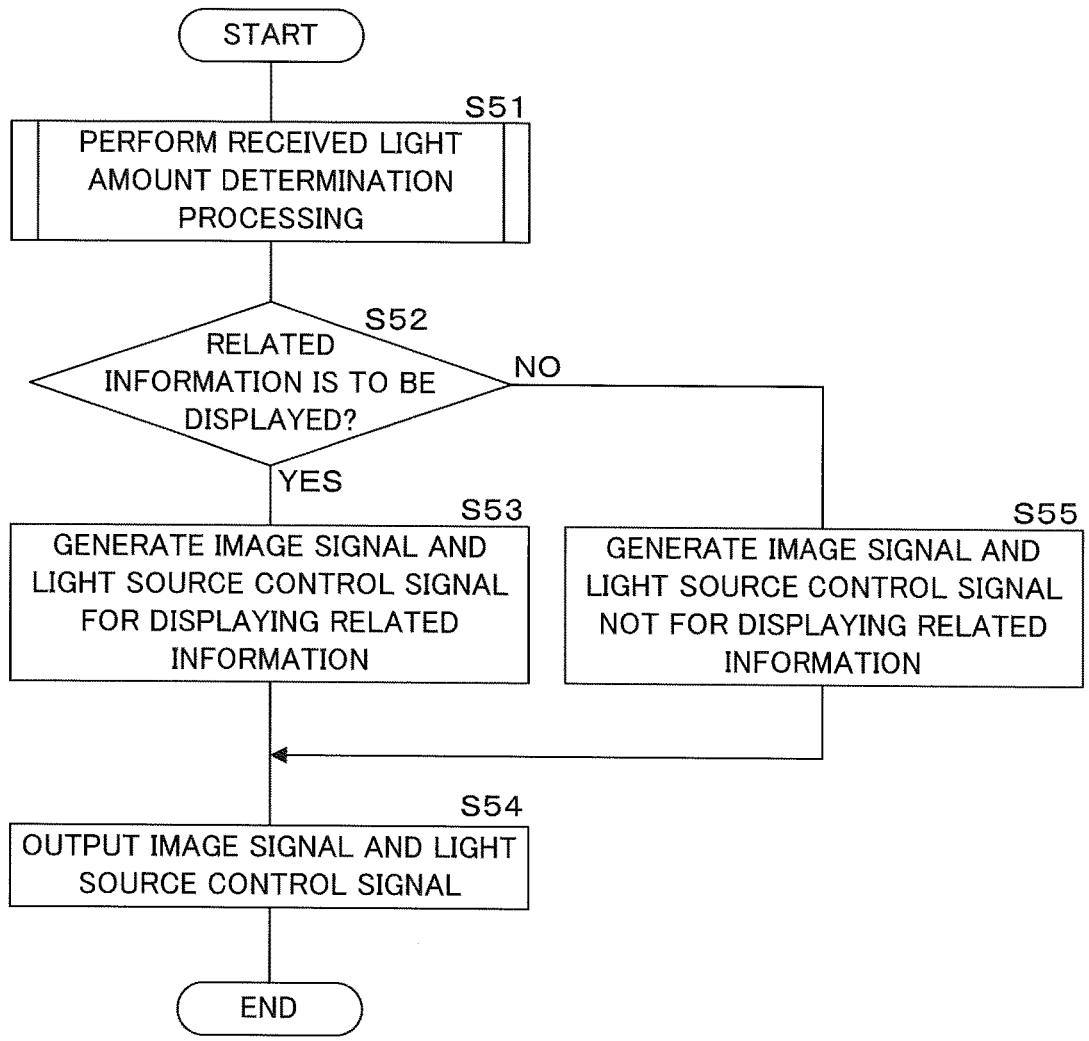
FIG. 19 is a flow chart illustrating an example of a processing procedure executed by the display control unit according to Embodiment 3.

FIG. 19 is a flow chart illustrating an example of the processing procedure executed by the display control unit 107 of Embodiment 3. The display control unit 107 periodically repeats the processing illustrated below at a predetermined time interval such as 500 milliseconds, for example.

The display control unit 107 performs the received light amount determination processing illustrated in the flow chart of FIG. 8 or 13 (step S51), and determines whether to display the related information, based on the positional information group stored in the temporary storage unit 110 (step S52). If it is determined that the cover is present and the related information is to be displayed (YES in S52), the display control unit 107 generates the image signal for displaying the related information in a caption form and the light source control signal corresponding to the image signal, based on the image data obtained from the control unit 11 (step S53), outputs the generated signals to the liquid crystal control unit 106 and the light source control unit 102, respectively (step S54), and ends the processing.

In step S52, if it is determined that the related information is not to be displayed (NO in S52), the display control unit 107 generates the image signal for displaying an image which does not include the related information and the light source control signal corresponding to the image signal, based on the image data obtained from the control unit 11 (step S55), outputs the generated signals to the liquid crystal control unit 106 and the light source control unit 102, respectively (S54), and ends the processing.

Figure 20:
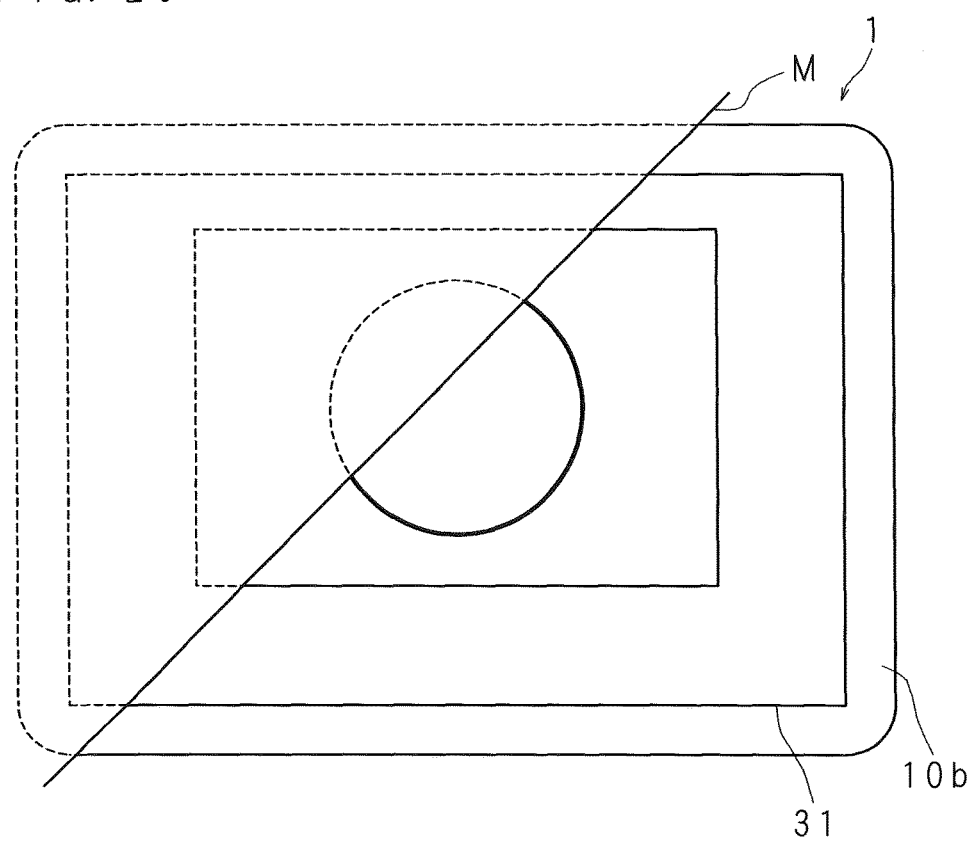
FIG. 20 is an explanatory view of a display example according to Embodiment 3 when the cover is present on the display unit.
Figure 21:
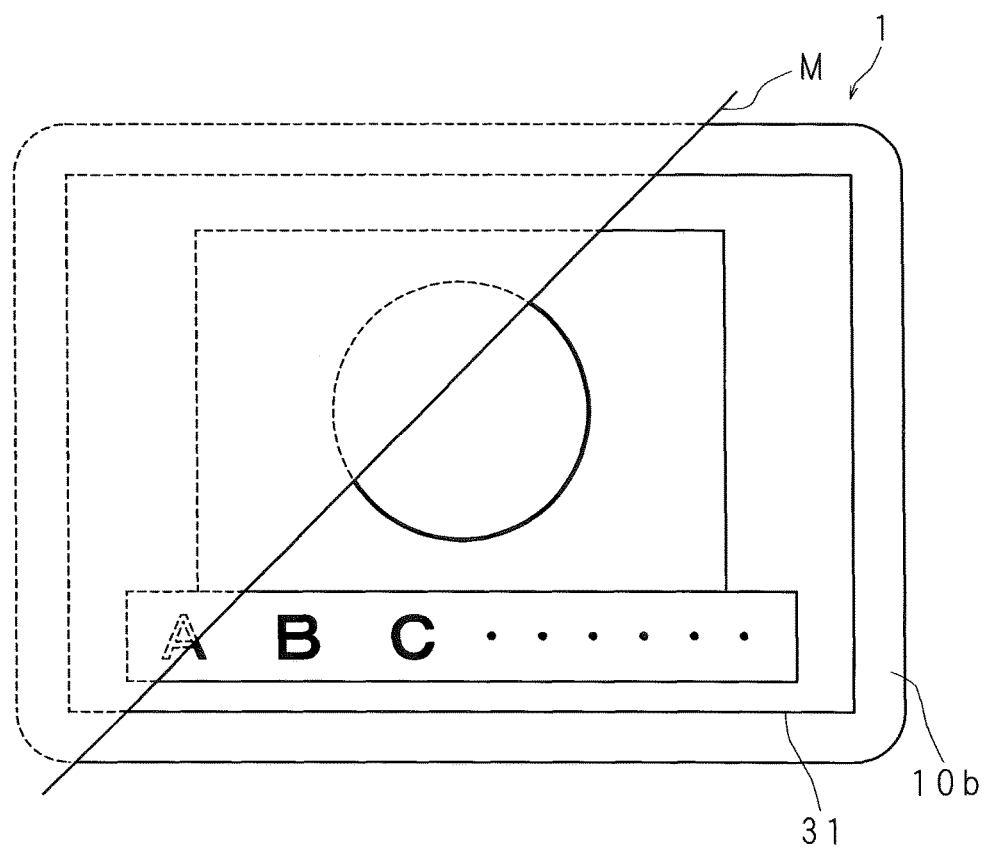
FIG. 21 is an explanatory view of another display example according to Embodiment 3 when the cover is present on the display unit.
Figure 22:
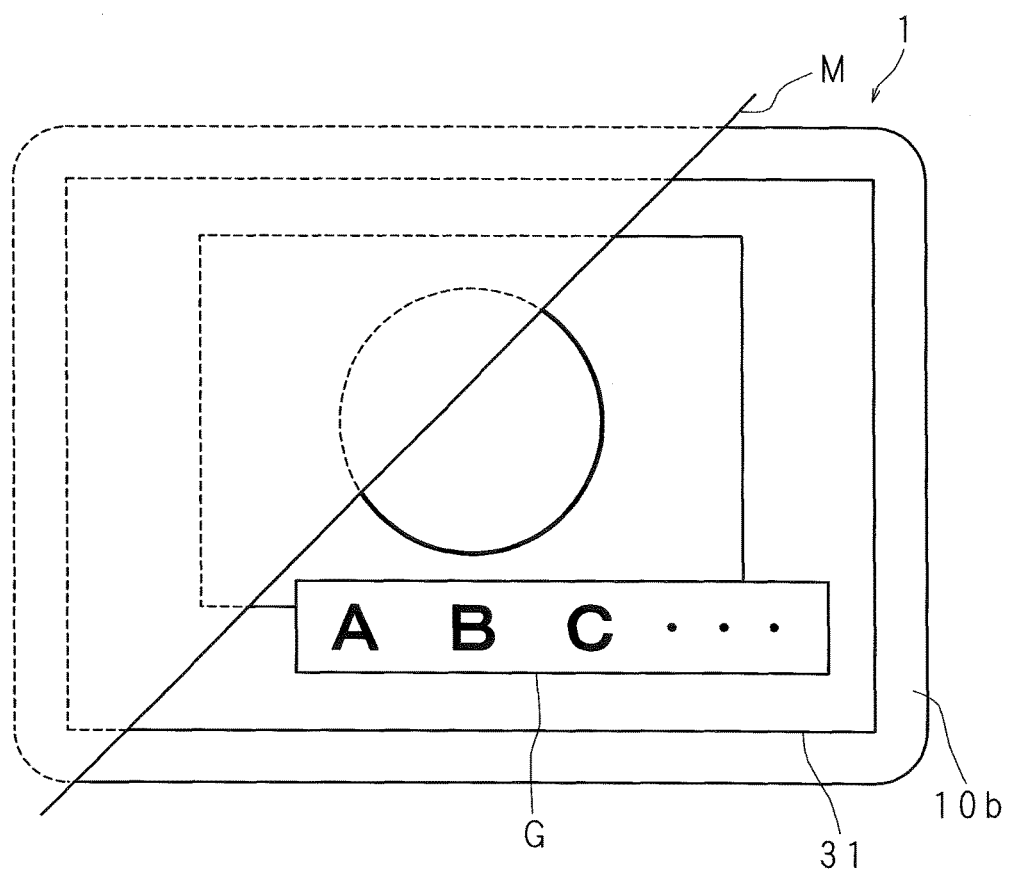
FIG. 22 is an explanatory view of another display example according to Embodiment 3 when the cover is present on the display unit.
Figure 23:
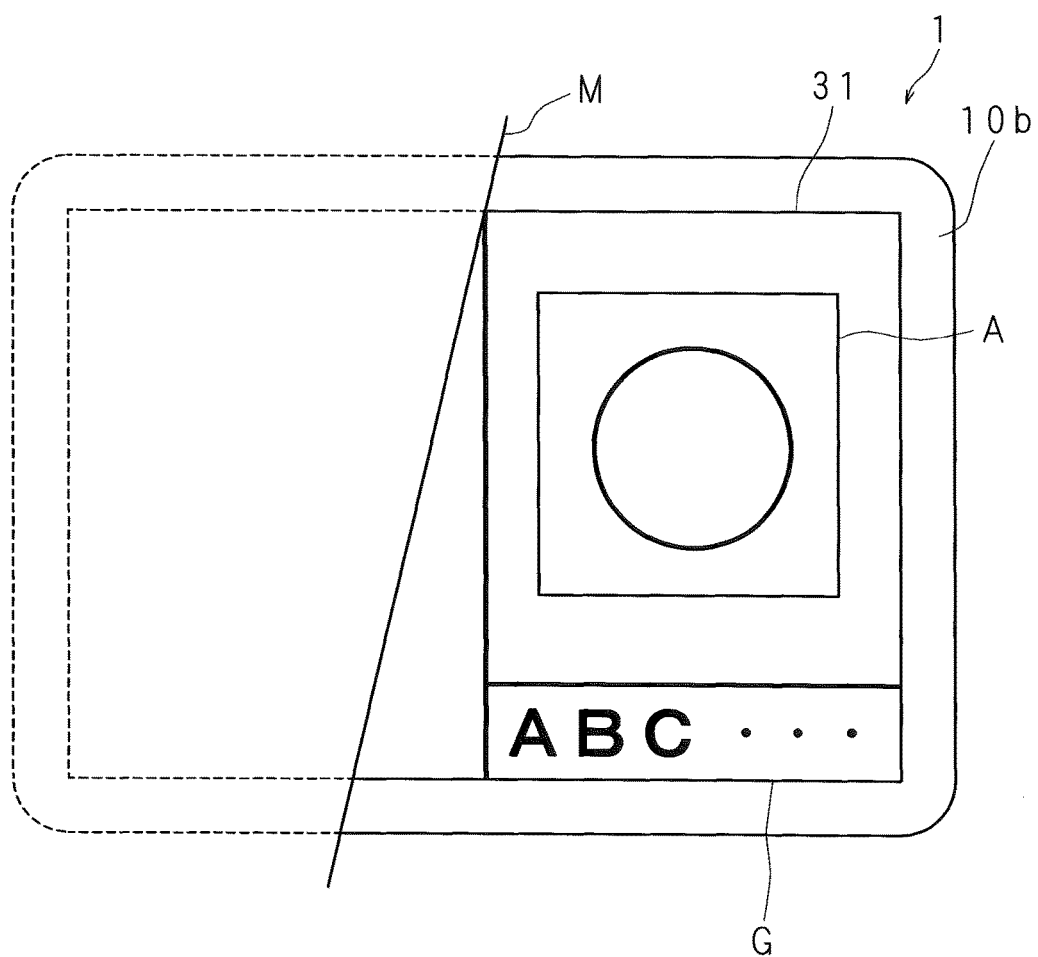
FIG. 23 is an explanatory view of another display example according to Embodiment 3 when the cover is present on the display unit.

FIGS. 20 to 23 are explanatory views of display examples according to Embodiment 3 when the cover is present on the display unit 100. FIG. 20 illustrates, as a comparison, a display example before displaying the related information, and FIGS. 21 to 23 illustrate display examples when it is determined by the display control unit 107, that the related information is to be displayed. Symbols M in FIGS. 20 to 23 denote the covers.

As illustrated in FIG. 20, when the image is displaying by using the entirety of the pixels of the pixel region 31, if the cover M is placed on the information processing apparatus 1, the cover M covers a part of the display unit 100. Thereby, it becomes a state in which a part of the pixel region 31 becomes the covered region illustrated by dotted lines, and a part of the displayed image cannot be viewed. Compared with this, as illustrated in FIGS. 21 to 23, when the cover M is present, by the processing of the display control unit 107, the related information is displayed. Further, in FIG. 22, the size of the characters or image is adjusted and output so that the related information is fitted into the remaining part, and in FIG. 23, the image and the related information based on the image data are displayed independently from each other. In the independent display of FIG. 23, the display control unit 107 determines whether a ratio occupied by an area of the remaining part to the pixel region 31 is a prescribed ratio or more, and only if it is determined that the ratio is the prescribed ratio or more, the image is classified into a display region A and a related information display region G. By the display region A and the related information display region G, the display control unit 107 may generate respective light source control signals and respectively output thereto, and thereby it is possible to achieve the display with an appropriate brightness, and further increase visibility. As described above, even when the cover is present, by the related information, the user may obtain information for supplementing the contents of the image during displaying, and confirm the contents of the image. Further, the display control unit 107 is configured to generate the image signal by overlapping the related information in the caption form, but it may be configured to display using an on-screen display (OSD).

In addition, by the functions of the related information display unit 75, the display control unit 107 may be configured to display the related information only if it is determined that the ratio occupied by the area of the remaining part to the pixel region 31 is the prescribed ratio or less. In particular, when a wide range including the central part is the covered region, it becomes a state of being difficult to confirm the contents of the image displayed in the remaining part. Therefore, it may be configured to display only the related information including the characters. As the prescribed ratio, an appropriate ratio is set in advance, for example, 30%, 20%, . . . and the like. Of course, it is the same as the related information display unit 75 determining whether a ratio occupied by the area of the covered region to the pixel region 31 is the prescribed ratio or more.

Figure 24:
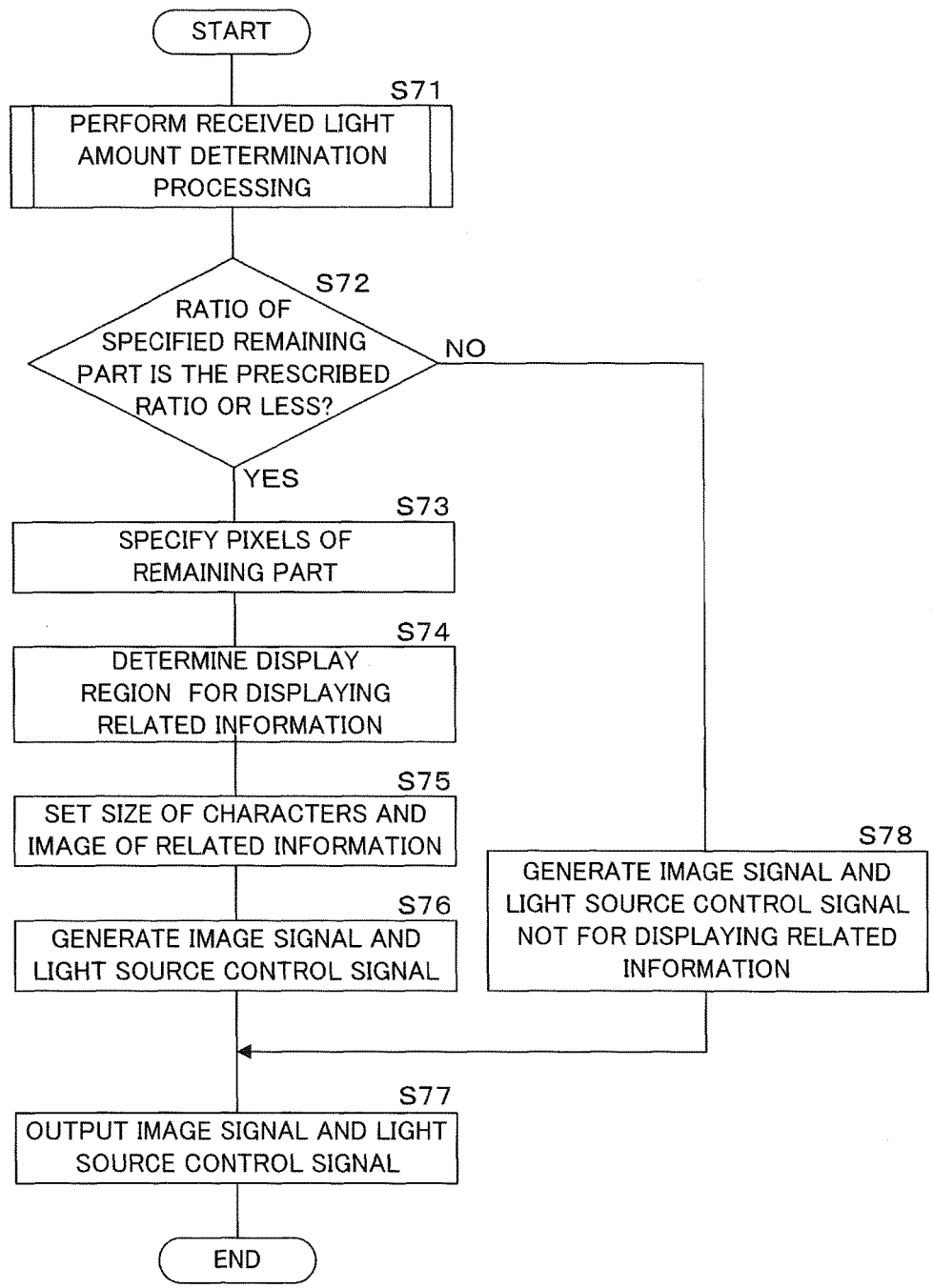
FIG. 24 is a flow chart illustrating another example of the processing procedure executed by the display control unit according to Embodiment 3.

FIG. 24 is a flow chart illustrating another example of the processing procedure executed by the display control unit 107 of Embodiment 3.

The display control unit 107 performs the received light amount determination processing illustrated in the flow chart of FIG. 8 or 13 (step S71), and determines whether a ratio occupied by the area of the remaining part outside the covered region to the pixel region 31 is the prescribed ratio or less, based on the positional information group stored in the temporary storage unit 110 (step S72). Further, in step S72, it may be configured to additionally determine whether the remaining part includes the central part. In step S72, if it is determined that the ratio is the prescribed ratio or less (YES in S72), the display control unit 107 specifies the pixels of the remaining part (step S73). The display control unit 107 determines the related information display region G, so as to display the related information within the pixels of the specified remaining part (step S74).

The display control unit 107 sets the size of the characters and image of the related information to be displayed within the related information display region G determined in step S74 (step S75). In step S75, the display control unit 107 adjusts the size of the characters or image so that the characters or image which are the related information are appropriately displayed within the related information display region G. The display control unit 107 generates the image signal for displaying the related information and the light source control signal corresponding to the image signal (step S76). The display control unit 107 outputs the generated image signal and light source control signal to the liquid crystal control unit 106 and the light source control unit 102, respectively (step S77), and ends the processing.

In step S72, if it is determined that the ratio occupied by the area of the remaining part is higher than the prescribed ratio (NO in S72), the display control unit 107 generates the image signal for displaying the image which does not include the related information and the light source control signal corresponding to the image signal, based on the image data obtained from the control unit 11 (step S78), outputs the generated signals to the liquid crystal control unit 106 and the light source control unit 102 (S77), respectively, and ends the processing.

By the above-described processing, when the wide range is the covered region, only the related information is displayed in the remaining part. If it is determined that the area of the remaining part is small as described above, it may be configured to display only the caption illustrating the related information, so as to suppress a decrease in visibility.

In Embodiments 1 to 3, the light receiving sensors 108 are configured to be equally provided in the pixel region 31 in the lattice shape, but it may be configured in such a manner that the light receiving sensor 108 is provided at a part (central part) of the pixel region 31, and the presence or absence of the cover is determined based on the received light amount in the light receiving sensor 108 of the part, and when the cover is present, the display control is performed. Further, the central part referred to herein does not mean only the center in a strict sense, and means the extent of the vicinity of the center.

Figure 25:
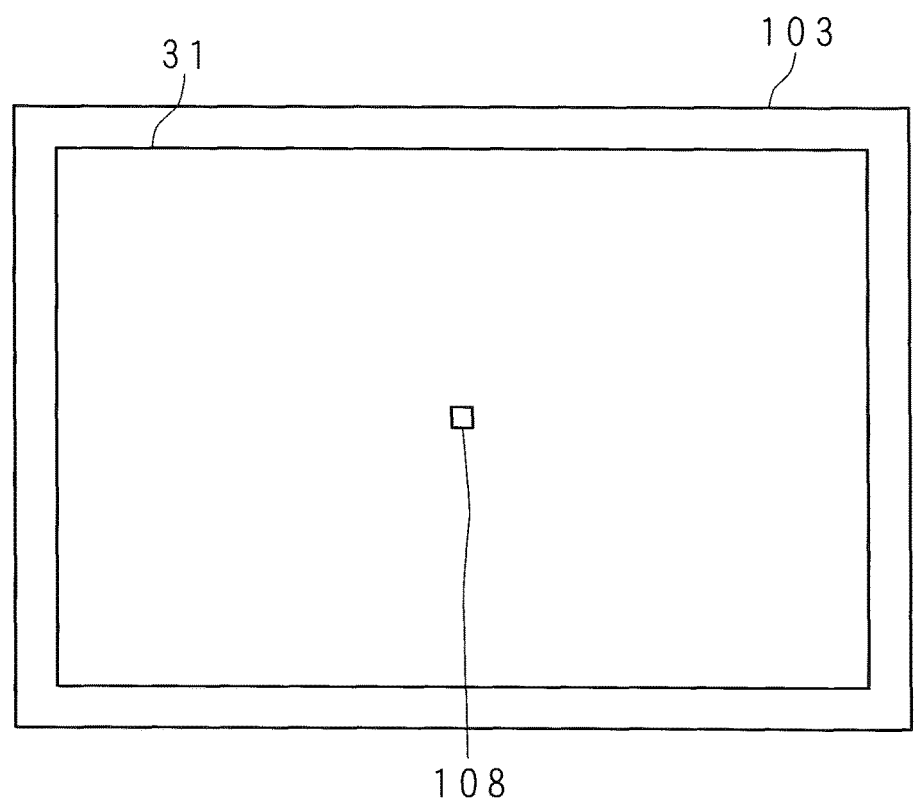
FIG. 25 is an explanatory view schematically illustrating another arrangement example of the light receiving sensor.

FIG. 25 is an explanatory view schematically illustrating another arrangement example of the light receiving sensor 108. FIG. 25 illustrates the front of the liquid crystal panel 103. As illustrated in FIG. 25, only one light receiving sensor 108 is provided at the central part on the pixel region 31. When providing one light receiving sensor 108 at the central part as illustrated in FIG. 25, the display control unit 107 determines whether the received light amount in the light receiving sensor 108 is the reference value 91 or less within the plurality of prescribed values stored in the storage unit 109, and if it is determined that the received light amount is the reference value 91 or less, displays the related information as described in Embodiment 3. Thereby, the user may obtain information for supplementing the contents of the image during displaying, without removing the cover. When the covered region includes the central part, in particular, it may become a state of being difficult to view the image on the pixel region 31. In the configuration using one light receiving sensor 108, it is difficult to specify the pixels of the remaining part, and thereby processing such as decreasing the display region may be difficult. However, by performing at least the determination of the display/non-display of the related information, it is possible to provide the information for supplementing the contents of the image to the user.

Figure 26:
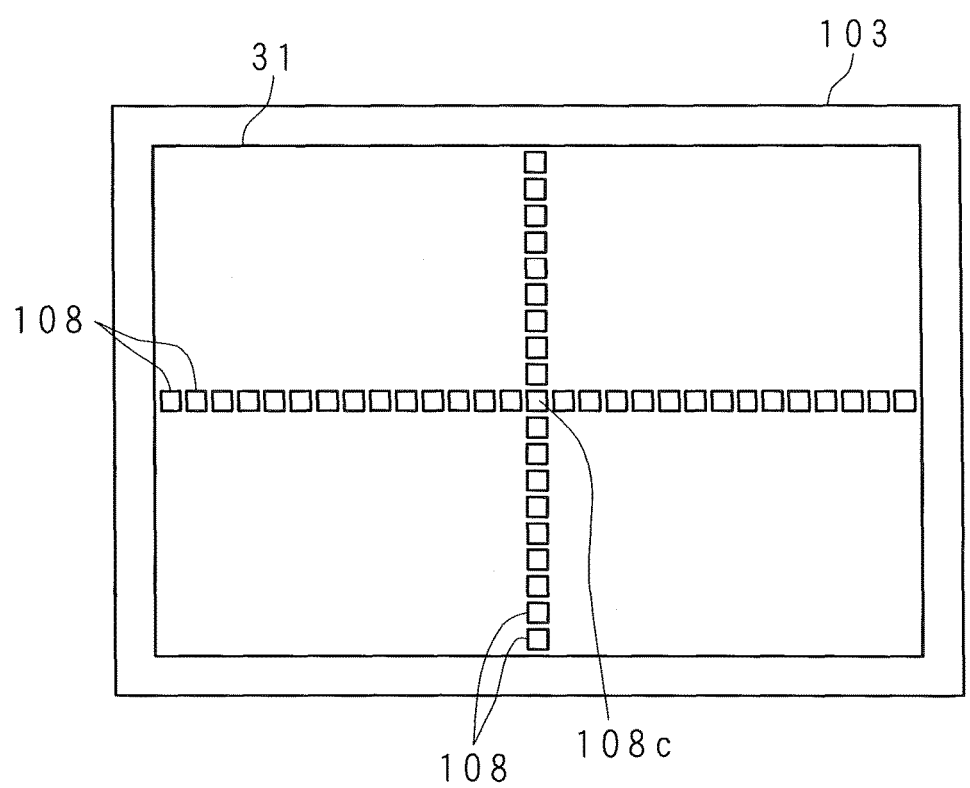
FIG. 26 is an explanatory view schematically illustrating another arrangement example of a plurality of light receiving sensors.

In addition, it may be configured that a plurality of light receiving sensors 108 are provided at a part of the pixel region 31 including the central part thereof, as well as only one light receiving sensor 108 is provided at the central part. FIG. 26 is an explanatory view schematically illustrating another arrangement example of the plurality of light receiving sensors 108. FIG. 26 illustrates the front of the liquid crystal panel 103. As illustrated in FIG. 26, the plurality of the light receiving sensors 108 are disposed in a cross shape passing through the vicinity of the center of the pixel region 31. The display control unit 107 may be configured so as to perform the determination by using only the received light amount in a light receiving sensor 108c of the central part, or by combining the received light amount in the plurality of light receiving sensors 108 in the vicinity of the central part including the light receiving sensor 108c.

In order to more accurately determine the presence or absence of the cover covering on the pixel region 31, when the received light amount on the pixel region 31 has a difference of a second prescribed value or more, the display control unit 107 may be configured so as to determine that the received light amount covering a part of the pixel region 31 is present.

In this case, the display control unit 107 respectively receives the received light amount data from the plurality of light receiving sensors 108, and classifies the plurality of received light amounts based on the received light amount data respectively received into a received light amount which is determined as higher than the reference value 91 and a received light amount which is determined as the reference value 91 or less. The display control unit 107 determines whether a difference between one classified received light amount and the other classified received light amount is the second prescribed value or more within the plurality of prescribed values stored in the storage unit 109, and outputs the determined result to the covered region specifying unit 72. In a method of determining the difference in light amount, when the received light amount in the entirety of the pixel region 31 becomes the reference value 91 or less, the received light amount in any light receiving sensor 108 on the pixel region 31 may be used for comparison so long as it can exclude a wrong determination that the cover is present.

Figure 27:
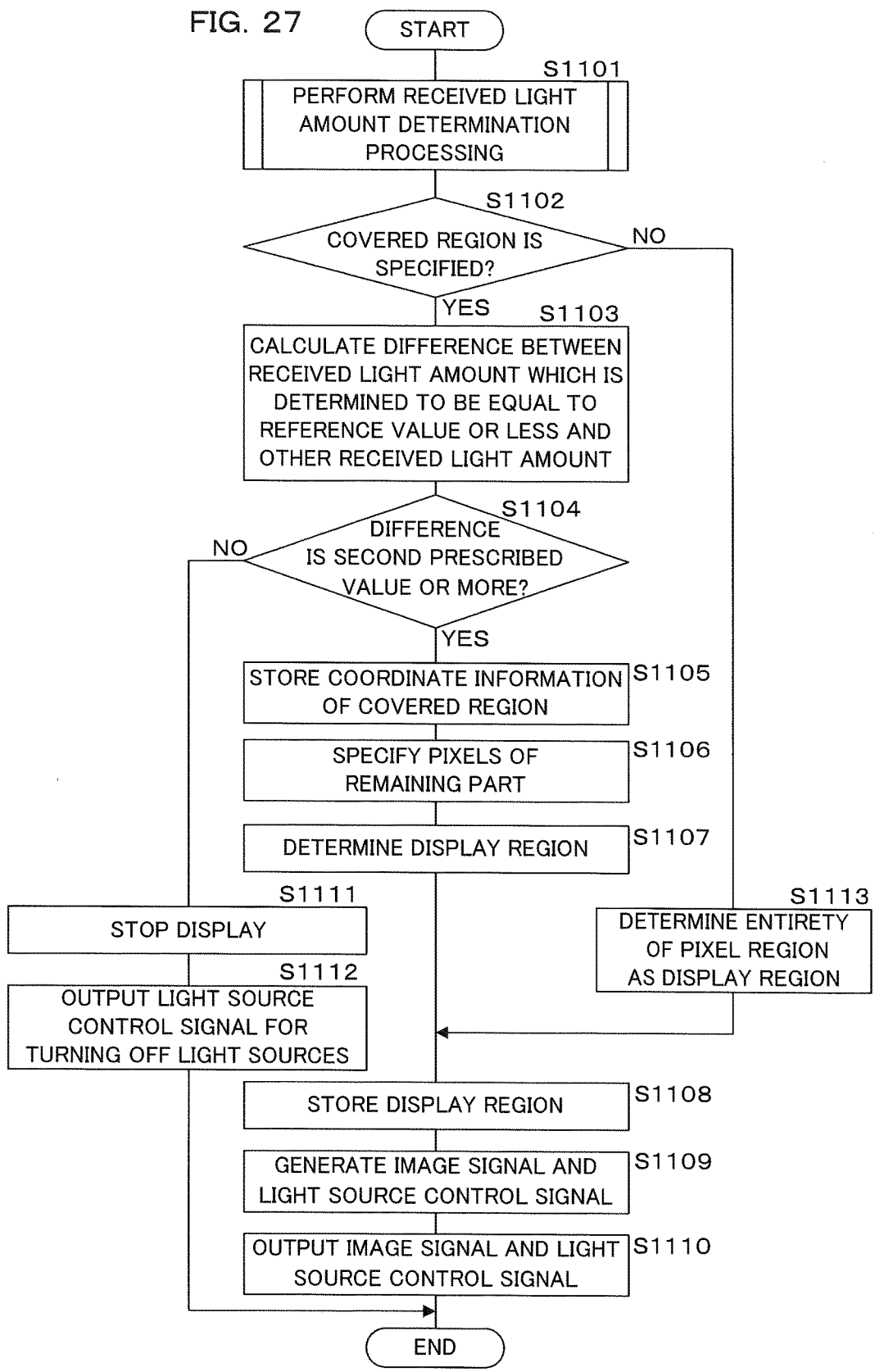
FIG. 27 is a flow chart illustrating another example of the processing procedure executed by the display control unit.

FIG. 27 is a flow chart illustrating another example of the processing procedure executed by the display control unit 107. The display control unit 107 periodically repeats the processing illustrated below at a predetermined time interval such as 500 milliseconds, for example.

The display control unit 107 performs the received light amount determination processing illustrated in the flow chart of FIG. 8 or 13 (step S1101), and determines whether the covered region is specified based on the positional information group stored in the temporary storage unit 110 (step S1102). If it is determined that the covered region is specified (YES in S1102), the display control unit 107 calculates a difference between the received light amount which is determined to the reference value 91 or less and the received light amount which is determined as higher than the reference value 91 (step S1103), and determines whether the difference is the second prescribed value or more (step S1104).

If it is determined that the difference is the second prescribed value or more (YES in S1104), the display control unit 107 stores the coordinate information of the specified covered region in the temporary storage unit 110 (step S1105). The display control unit 107 specifies the pixels of the remaining part based on the coordinate information stored in the temporary storage unit 110 (step S1106), and determines the display region including a part and/or all of the pixels of the specified remaining part (step S1107). The display control unit 107 stores the determined display region in the temporary storage unit 11 (step S1108).

The display control unit 107 generates the image signal for displaying an image in the determined display region based on the image data output from the control unit 11 and the light source control signal corresponding to the image signal (step S1109), outputs the generated signals to the liquid crystal control unit 106 and the light source control unit 102, respectively (step S1110), and ends the processing.

In step S1104, if it is determined that the difference is less than the second prescribed value (NO in S1104), since the received light amount of the pixel region 31 as a whole is the reference value 91 or less, the display control unit 107 stops the display (step S1111), outputs the light source control signal for turning off the light sources 111 (step S1112), and ends the processing.

In step S1102, if it is determined that the covered region is not specified (NO in S1102), the display control unit 107 determines the entirety of the pixel region 31 as the display region (step S1113), and progresses the processing to step S1008.

Thereafter, the display control unit 107 either continuously turns off the light sources 111 by stopping the display until the processing from steps S1101 to S1113 are performed, or continuously generates and outputs the image signal based on the image data output from the control unit 11, so as to display the image in the determined display region.

Figure 28:
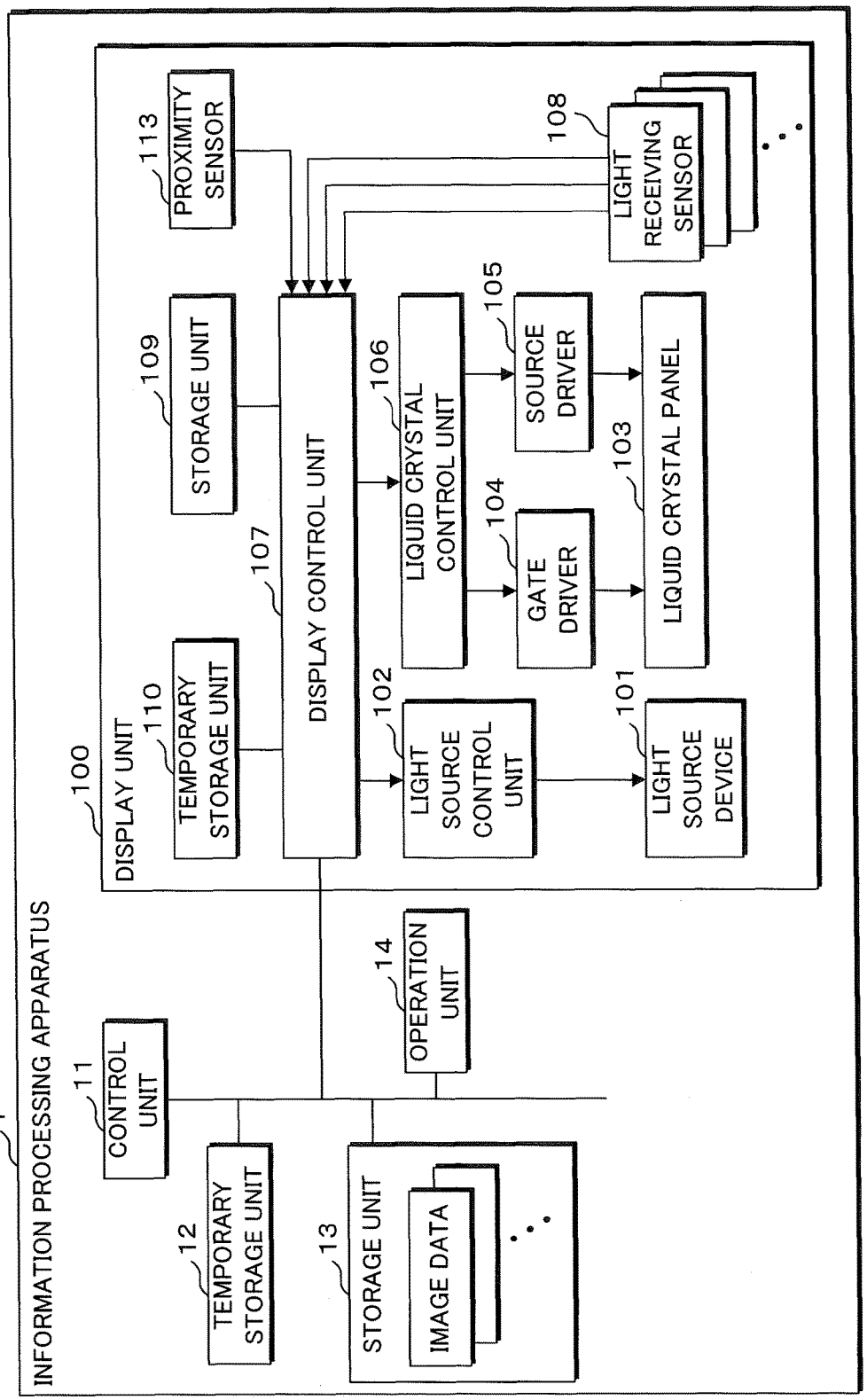
FIG. 28 is a block diagram illustrating another configuration of the information processing apparatus.

In order to more accurately determine the presence or absence of the cover covering on the pixel region 31, it is possible to use a proximity sensor which is provided in advance in an equipment called a tablet type PC or a smart phone as the information processing apparatus 1. FIG. 28 is a block diagram illustrating another configuration of the information processing apparatus 1. The hardware configuration of the information processing apparatus 1 to be described below is the same as the configuration in Embodiment 1, except that a proximity sensor 113 is provided. Therefore, the configuration equivalent thereto will be denoted by the same reference numerals, and will not be described in detail.

The proximity sensor 113 is a sensor for detecting whether an object approaches within a constant distance. The proximity sensor 113 uses, for example, an infrared type sensor which utilizes reflection of an infrared ray. The proximity sensor 113 is configured by providing a light emitting element and a light receiving element so as to be difficult to see, in the vicinity of the outer edge of an opening part of a chassis 10b which is a rectangular frame body, and when a proximity object is present, notifies the display control unit 107 of the fact. The proximity sensor 113 is not limited to the infrared type, and can use any type such as an electrostatic capacitance type, inductive type, magnetic type and the like.

Figure 29:
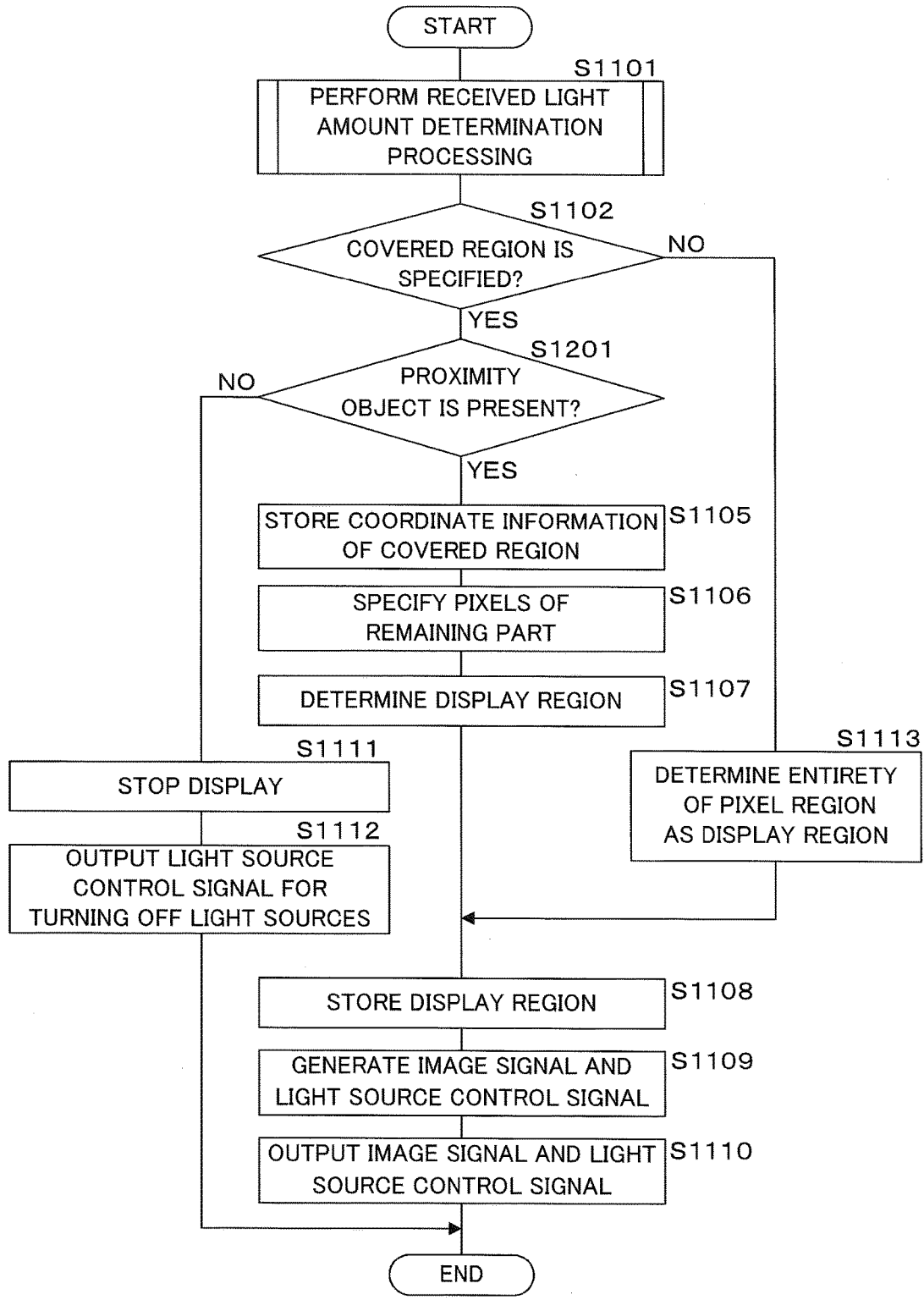
FIG. 29 is a flow chart illustrating another example of the processing procedure executed by the display control unit.

In this case, when determining whether the covered region is specified by the covered region specifying unit 72, only if it is determined by the proximity sensor 113, that the proximity object is present, the display control unit 107 determines that the covered region covering a part of the pixel region 31 is present. FIG. 29 is a flow chart illustrating another example of the processing procedure executed by the display control unit 107. Further, most of the processing procedure illustrated below is equivalent to the processing procedure illustrated in the flow chart of FIG. 27, and therefore the processing equivalent thereto will be denoted by the same step numerals, and will not be described in detail.

If it is determined that the covered region is specified (YES in S1102), the display control unit 107 determines whether the proximity object is present based on the proximity sensor 113 (step S1201). If it is determined that the proximity object is present (YES in S1201), the display control unit 107 stores the coordinate information of the specified covered region in the temporary storage unit 110 (S1105), and performs the processing of steps S1106 to S1110.

In step S1201, if it is determined that the proximity object is not present (NO in S1201), since the received light amount of the pixel region 31 as a whole is the reference value 91 or less, the display control unit 107 stops the display (S1111), outputs the light source control signal for turning off the light sources 111 (S1112), and ends the processing.

Thereby, it is possible to prevent a wrong determination that the cover is present, when environmental light is dark or the like.

In the above-described Embodiments, the configurations, in which the present invention is applied to the information processing apparatus 1 which is a tablet type PC, and the information processing apparatus 1 is placed on the desk, for example, and when the pixel region is covered by an object placed thereon, the image display is appropriately controlled, has been described. However, of course, the present invention is not limited thereto. For example, in not only the equipment including the display so as to be used by placing on the desk as the tablet type PC, but also the display apparatus which is erected upright with leg parts, it is possible to achieve an appropriate display when the cover is present on the pixel region.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A display apparatus comprising:
 a transmissive liquid crystal panel provided with a pixel region including a plurality of pixels;
 a plurality of light receiving sensors which are provided at positions different from each other in the pixel region to receive environmental light and output received light amount data; and
 a display controller controlling display on the liquid crystal panel;
 wherein
 the display controller
 determines whether or not each received light amount is a first prescribed value or less based on the received light amount data respectively output from the plurality of light receiving sensors,
 determines whether a difference between a received light amount in a first part and a received light amount in a second part other than the first part is a second prescribed value or more if it is determined that the received light amount in the first part is the first prescribed value or less, and
 displays
 an image in the pixels of a remaining part other than the region corresponding to the first part of the plurality of light receiving sensors in the pixel region, if it is determined that the difference is the second prescribed value or more.

2. The display apparatus according to claim 1, further comprising:
 a priority image display unit selecting and displaying the image based on a level of the priority when displaying a plurality of images having respective priorities applied thereto in the pixels of the remaining part.

3. The display apparatus according to claim 1, wherein the display controller determines whether an image display is executed by the pixels of the remaining part or not, based on a position of the light receiving sensor for which it has been determined that the received light amount is the first prescribed value or less.

4. The display apparatus according to claim 3, wherein the light receiving sensors are juxtaposed in a lattice shape within the pixel region.

5. The display apparatus according to claim 4, wherein the display controller specifies an area or a shape of the remaining part, and
 adjusts a size of an image to be displayed depending on the area or shape of the remaining part specified.

6. The display apparatus according to claim 1, further comprises:
 a proximity sensor detecting presence or absence of an object on the pixel region,
 wherein
 if it is detected that the object is not present by the proximity sensor, the display controller stops the image display by the pixels of the remaining part.

7. The display apparatus according to claim 1, further comprises a priority image display unit selecting and displaying the image based on a level of the priority, when a plurality of images having respective priorities applied thereto in the pixels of the remaining part.

8. The display apparatus according to claim 7, wherein the priority image display unit intermittently displaying a non-selected image in the remaining part.

9. The display apparatus according to claim 1, further comprising:
 a light source device irradiating a rear surface of the liquid crystal panel with flat light; and a liquid crystal driver driving liquid crystal in the liquid crystal panel so as to correspond to the plurality of pixels;

wherein the display controller decreases the amount of light from the light source device in a part of the pixel region including a region other than the remaining part, or the amount of light from the light source device in an entirety of the pixel region.

10. The display apparatus according to claim 1, further comprising:

a pixel region including a plurality of pixels;

a cover determination unit determining whether a cover covering a part of the pixel region is present; and a related information display unit displaying related information including an image or characters which are stored in association with the image during displaying, if it is determined that the cover is present by the cover determination unit.

11. The display apparatus according to claim 10, wherein one light receiving sensor of the plurality of light receiving sensors is provided at a central part of the pixel region, and the related information display unit displaying the related information if it is determined that the received light amount in the one light receiving sensor of the plurality of light receiving sensors is the first prescribed value or less.

12. The display apparatus according to claim 10, further comprising:

an area determination unit determining whether a ratio of an area of the remaining part to the area of the pixel region is a prescribed ratio or less, wherein the related information display unit displays the related information if it is determined that the ratio of the area is the prescribed ratio or less by the area determination unit.

13. The display apparatus according to claim 10, wherein the related information display unit displays the related information within the remaining part.

14. The display apparatus according to claim 13, wherein the related information display unit changes a size of the image or characters of the related information depending on the size or shape of the remaining part and displays the related information.

* * * * *